US011927903B2

(12) United States Patent
Ohashi et al.

(10) Patent No.: US 11,927,903 B2
(45) Date of Patent: Mar. 12, 2024

(54) HEATING DEVICE AND APPARATUS UTILIZING OBJECT TO BE HEATED

(71) Applicant: FUJIFILM Business Innovation Corp., Tokyo (JP)

(72) Inventors: Takashi Ohashi, Kanagawa (JP); Takashi Matsubara, Kanagawa (JP); Takuma Ishihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/902,887

(22) Filed: Sep. 4, 2022

(65) Prior Publication Data

US 2023/0305460 A1 Sep. 28, 2023

(30) Foreign Application Priority Data

Mar. 23, 2022 (JP) ................................ 2022-046181

(51) Int. Cl.
*G03G 15/20* (2006.01)
*G03G 21/16* (2006.01)

(52) U.S. Cl.
CPC ..... *G03G 15/2053* (2013.01); *G03G 15/2064* (2013.01); *G03G 21/1647* (2013.01); *G03G 2215/2038* (2013.01); *G03G 2221/1639* (2013.01)

(58) Field of Classification Search
CPC ........... G03G 15/2039; G03G 15/2053; G03G 15/2064; G03G 21/1647; G03G 2215/2038; G03G 2221/1639
See application file for complete search history.

(56) References Cited

U.S. PATENT DOCUMENTS

| | | | | | |
|---|---|---|---|---|---|
| 2011/0091225 | A1* | 4/2011 | Yamamoto | G03G 15/2039 | 399/33 |
| 2014/0037347 | A1* | 2/2014 | Kim | G03G 15/2042 | 399/328 |
| 2014/0161479 | A1* | 6/2014 | Yoshida | G03G 15/2053 | 399/329 |
| 2014/0376978 | A1* | 12/2014 | Jeon | G03G 15/206 | 399/329 |

FOREIGN PATENT DOCUMENTS

JP H09114315 5/1997

* cited by examiner

*Primary Examiner* — Sophia S Chen
(74) *Attorney, Agent, or Firm* — JCIPRNET

(57) ABSTRACT

A heating device includes a heating roller that includes a resistance heating layer, a bearing that supports the heating roller to allow the heating roller to be rotatable, and a connection power feeder that is mounted on an end portion of the heating roller, is connected to the resistance heating layer, and feeds power to the resistance heating layer, in which the connection power feeder includes an annular frame that is disposed to be concentric with the heating roller and is conductively connected to the resistance heating layer, a power feed shaft of which a portion is disposed in the frame and which feeds power, and plural rolling bodies that roll while being in conductive contact with an inner peripheral surface of the frame and an outer peripheral surface of the power feed shaft, and the bearing is mounted on a portion of the end portion of the heating roller that is closer to an inside than the connection power feeder in an axial direction.

20 Claims, 18 Drawing Sheets

HEATING DEVICE AND APPARATUS UTILIZING OBJECT TO BE HEATED

CROSS-REFERENCE TO RELATED APPLICATIONS

This application is based on and claims priority under 35 USC 119 from Japanese Patent Application No. 2022-046181 filed Mar. 23, 2022.

BACKGROUND

(i) Technical Field

The present invention relates to a heating device and an apparatus utilizing an object to be heated.

(ii) Related Art

JP1997-114315A (Paragraph Nos. [0019]-[0021], FIG. 1) discloses a fixing device including a heating roller where an electrical insulating layer and a layered resistance heating element are formed in this order on an inner peripheral surface of a core roller.

Further, JP1997-114315A (Paragraph Nos. [0019]-[0021], FIG. 1) discloses a configuration in which conductive ring-shaped power receiving members are fixed to the inner peripheral surfaces of both ends of the resistance heating element of the heating roller by fitting and are electrically connected to the resistance heating element and a pair of conductive power feed members are disposed in the internal space of the core roller to be pressed against the power receiving members by springs, respectively, so that electrical connection between the power receiving members and the power feed members is kept on contact surfaces between the power receiving members and the power feed members even though the power receiving members are rotated integrally with the core roller.

SUMMARY

Aspects of non-limiting embodiments of the present disclosure relate to a heating device and an apparatus utilizing an object to be heated using the heating device that can stably feed power to a resistance heating layer of a rotating heating roller without an increase in the size of a device as compared to a case where power is fed to a resistance heating layer of a rotating heating roller including the resistance heating layer via a power feed member being in contact with a part of the rotating heating roller at a predetermined position, a case where a bearing is disposed at a portion of an end portion of the heating roller closer to the outside than a connection power feeder, and a case where the connection power feeder is caused to function as a bearing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a heating device including: a heating roller that includes a resistance heating layer; a bearing that supports the heating roller to allow the heating roller to be rotatable; and a connection power feeder that is mounted on an end portion of the heating roller, is connected to the resistance heating layer, and feeds power to the resistance heating layer, in which the connection power feeder includes an annular frame that is disposed to be concentric with the heating roller and is conductively connected to the resistance heating layer, a power feed shaft of which a portion is disposed in the frame and which feeds power, and a plurality of rolling bodies that roll while being in conductive contact with an inner peripheral surface of the frame and an outer peripheral surface of the power feed shaft, and the bearing is mounted on a portion of the end portion of the heating roller that is closer to an inside than the connection power feeder in an axial direction.

BRIEF DESCRIPTION OF THE DRAWINGS

Exemplary embodiment(s) of the present invention will be described in detail based on the following figures, wherein.

DETAILED DESCRIPTION

Exemplary embodiments of the present invention will be described below with reference to the drawings.

First Exemplary Embodiment

Figure 1:
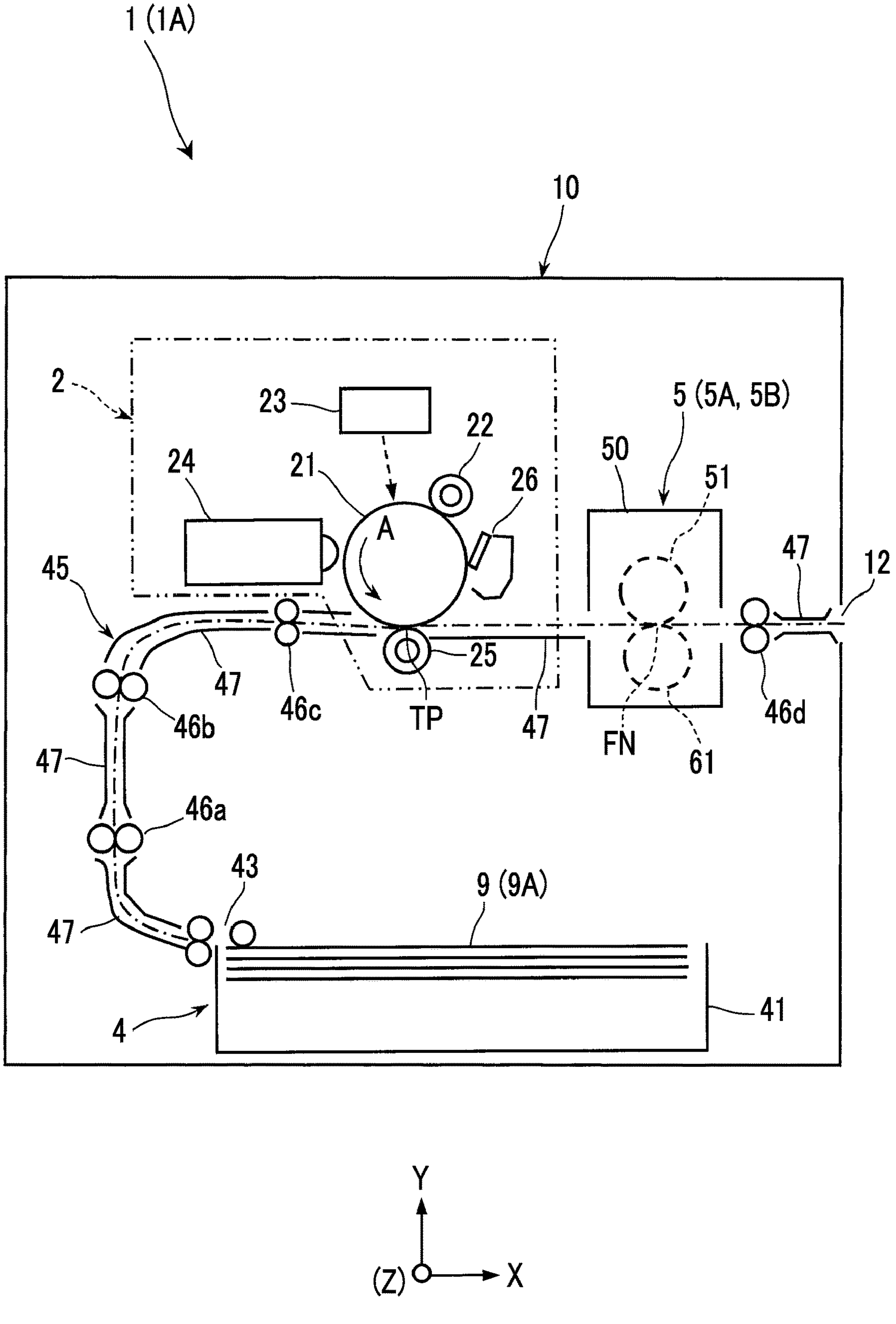
FIG. 1 is a schematic diagram of an image forming apparatus that is an example of an apparatus utilizing an object to be heated according to a first exemplary embodiment.
Figure 2:
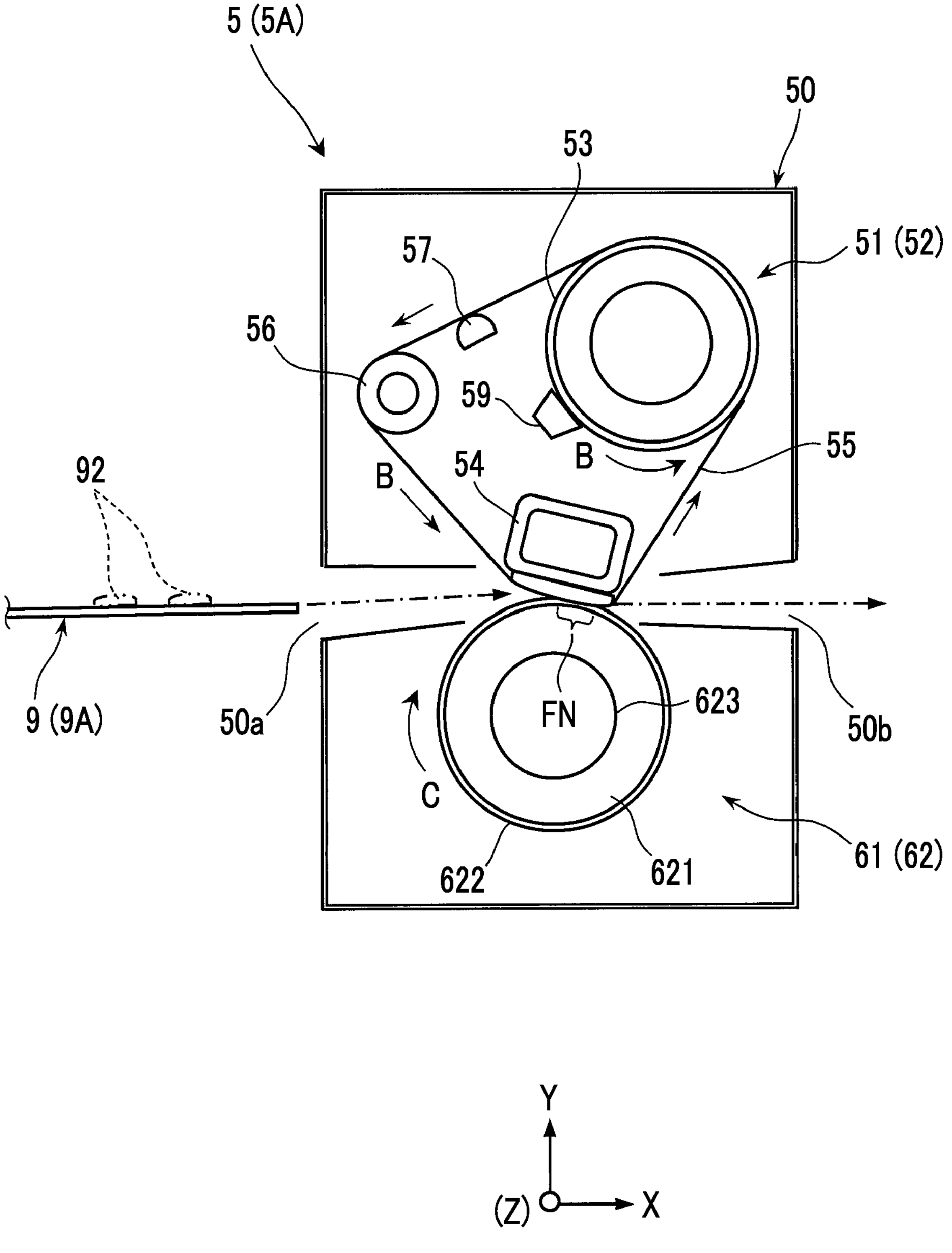
FIG. 2 is a schematic diagram of a fixing device that is an example of a heating device according to the first exemplary embodiment.

FIG. 1 shows an apparatus 1 utilizing an object to be heated according to a first exemplary embodiment. FIG. 2 shows a heating device 5 according to the first exemplary embodiment.

In the following description, a direction indicated in the drawings by an arrow X is a width direction of the device, a direction indicated by an arrow Y is a height direction of the device, and a direction indicated by an arrow Z is a depth direction of the device orthogonal to each of the width direction and the height direction. A circle given to an intersection between the arrow X and the arrow Z in the drawings means the arrow Z corresponding to the depth direction of the device faces downward to be orthogonal to the drawing (the plane of paper).

The apparatus 1 utilizing an object to be heated according to the first exemplary embodiment is an apparatus that utilizes a sheet-like object 9 to be heated. The apparatus 1 utilizing an object to be heated is formed as an image forming apparatus 1A that is an example thereof.

Further, the heating device 5 according to the first exemplary embodiment is a device that at least heats a sheet-like object 9 to be heated. The heating device 5 is formed as a fixing device 5A that is an example thereof.

Apparatus Utilizing Object to be Heated

The image forming apparatus 1A, which is an example of the apparatus 1 utilizing an object to be heated, is an apparatus that forms an image consisting of a powder developer on a sheet-like object 9 to be heated and then forms an image by heating. A recording medium 9A, which is an example of the sheet-like object 9 to be heated, is applied as the sheet-like object 9 to be heated.

As shown in FIG. 1, the image forming apparatus 1A includes a housing 10 formed in a required external shape and has a configuration in which an image forming device 2, a medium supply device 4, a medium transport device 45, a fixing device 5A, and the like disposed in the internal space of the housing 10. A dashed-dotted line shown in FIG. 1 indicates a major transport path in a case where a recording medium 9A is transported in the housing 10 by the medium transport device 45.

The image forming device 2 is a device that forms a toner image made of toner used as a developer and transfers the toner image to the recording medium 9A. The image forming device 2 is formed as a device that employs, for example, an image forming method, such as an electrophotographic method, and has a configuration in which various devices, such as a charging device 22, an exposure device 23, a developing device 24, a transfer device 25, and a cleaning device 26 are disposed around a photoreceptor drum 21 rotating in a direction indicated by an arrow A.

Among these components, the photoreceptor drum 21 is an example of an image holder and is a photoreceptor that is formed in the shape of a drum including an image forming surface and a photoreceptor layer serving as an image holding surface. The charging device 22 is a device that charges the outer peripheral surface (image forming surface) of the photoreceptor drum 21 to a required surface potential. The charging device 22 includes, for example, a charging member formed in the shape of a roller or the like which is in contact with the image forming surface as the outer peripheral surface of the photoreceptor drum 21 and to which a charging current is supplied.

The exposure device 23 is a device that performs exposure, which is based on image information, on the charged outer peripheral surface of the photoreceptor drum 21 to form an electrostatic latent image. The exposure device 23 receives image signals, which are generated in a case where image information input from the outside is subjected to required processing by an image processing unit (not shown) or the like, and operates. The image information is information related to, for example, an image to be formed, such as texts, figures, photographs, and patterns. The developing device 24 is a device that develops the electrostatic latent image, which is formed on the outer peripheral surface of the photoreceptor drum 21, with a developer (toner) having a corresponding predetermined color (for example, black) to visualize the electrostatic latent image as a monochromatic toner image.

Next, the transfer device 25 is a device that electrostatically transfers the toner image formed on the outer peripheral surface of the photoreceptor drum 21 to the recording medium 9A. The transfer device 25 includes a transfer member formed in the shape of a roller or the like which is in contact with the outer peripheral surface of the photoreceptor drum 21 and to which a transfer current is supplied. The cleaning device 26 is a device that removes unnecessary materials, such as unnecessary toner and paper dust adhering to the outer peripheral surface of the photoreceptor drum 21, to clean the outer peripheral surface of the photoreceptor drum 21.

In the image forming device 2, a portion where the photoreceptor drum 21 and the transfer device 25 face each other is a transfer position TP where the toner image is transferred.

The medium supply device 4 is a device that stores and sends recording mediums 9A to be supplied to the transfer position TP of the image forming device 2. The medium supply device 4 has a configuration in which a container 41 storing recording mediums 9A and devices, such as a single or a plurality of sending devices 43 for sending the recording mediums 9A one by one, are disposed. The number of the containers 41 and the number of the sending devices 43 are not limited to one and a plurality of containers 41 and a plurality of sending devices 43 may be applied.

The recording medium 9A may be a sheet-like recording medium which can be transported by the medium transport device 45 provided in the housing 10 and to which a toner image can be transferred and fixed by heat, and the material, form, and the like of the recording medium 9A are not particularly limited. In the image forming apparatus 1A, recording mediums, such as plain paper, coated paper, a film, foil, and a sheet-like cloth, cut to a predetermined size, and a recording medium, such as an envelope, are used as the recording medium 9A.

The medium transport device 45 is a device that is an example of a transport device for transporting an object 9 to be heated, such as the recording medium 9A. The medium transport device 45 of the image forming apparatus 1A is formed as a device that transports the recording medium 9A up to a required position in the housing 10.

The medium transport device 45 is disposed so that a supply path along which the recording medium 9A is transported up to the transfer position TP of the image forming device 2 from the medium supply device 4, a relay path along which the recording medium 9A is transported up to the fixing device 5A from the transfer position TP of the image forming device 2, a discharge path along which the recording medium 9A is transported up to a discharge port 12 provided on a side portion or the like of the housing 10 from the fixing device 5A, and the like are formed in the housing 10.

Specifically, the medium transport device 45 has a configuration in which a required number of pairs of transport rollers 46 (46*a* to 46*d*) for sandwiching and transporting the recording medium 9A, a required number of guide channel members 47 for forming a transport space, which guides the recording medium 9A to a transport destination, and the like are arranged at required positions.

The fixing device 5A, which is an example of the heating device 5, is a device that performs processing for heating and pressurizing the recording medium 9A to fix a toner image, which is transmitted at the transfer position TP of the image forming device 2 and is not fixed, to the recording medium 9A. The fixing device 5A has a configuration in which devices, such as a heating rotor 51 and a pressure rotor 61, are disposed in the internal space of a housing 50 provided with an introduction port 50*a* and a discharge port 50*b* for the recording medium 9A.

Further, in the fixing device 5A, the heating rotor 51 and the pressure rotor 61 are disposed to rotate while being in contact with each other as shown in FIGS. 1 and 2, and a contact portion between the heating rotor 51 and the pressure rotor 61 is formed as a fixing processing portion FN where the recording medium 9A and the toner image passing therethrough are heated and pressurized.

The details of the fixing device 5A will be described later.

Then, an image is formed, for example, as follows in the image forming apparatus LA.

That is, in a case where a control unit (not shown) receives an instruction to perform an operation for forming an image in the image forming apparatus 1A, a charging operation, an exposure operation, a developing operation, and a transfer operation are performed in the image forming device 2 and an operation for sending a required recording medium 9A and transporting and supplying the recording medium 9A up to the transfer position TP along the supply path of the medium transport device 45 is performed in the medium supply device 4.

Accordingly, a toner image corresponding to image information is formed on the photoreceptor drum 21, and the toner image is transferred to the recording medium 9A supplied up to the transfer position TP from the medium supply device 4 via the medium transport device 45. Further, in this case, the recording medium 9A is separated from the photoreceptor drum 21 in a state where the recording medium 9A to which the toner image is transferred is sandwiched between the rotating photoreceptor drum 21 and the transfer device 25, and is then sent to the heating device 5 along the relay path of the medium transport device 45.

Then, in the image forming apparatus LA, a fixing operation for introducing the recording medium 9A to which a toner image 92 is transferred to the fixing processing portion FN provided at a portion where the heating rotor 51 and the pressure rotor 61 are in contact with each other and causing the recording medium 9A to pass through the fixing processing portion FN is performed in the fixing device 5A as shown in FIG. 2. Accordingly, in the fixing device 5A, the unfixed toner image 92 formed on the recording medium 9A is heated under pressure and is melted and fixed to the recording medium 9A.

After the recording medium 9A to which the toner image is fixed is discharged from the housing 50 in a state where the recording medium 9A is sandwiched between the heating rotor 51 and the pressure rotor 61 of the fixing device 5A, the recording medium 9A is transported up to the discharge port 12 along the discharge path for the medium transport device 45, is finally sent to a discharged sheet storage unit (not shown), which is provided at a part of the housing 10, by the transport roller 46*d*, and is stored in the discharged sheet storage unit.

A basic image forming operation for forming a monochromatic image on one surface of one recording medium 9A is completed by a series of operations described above.

Heating Device

Next, the fixing device 5A, which is an example of the heating device 5, will be described in detail.

Figure 3:
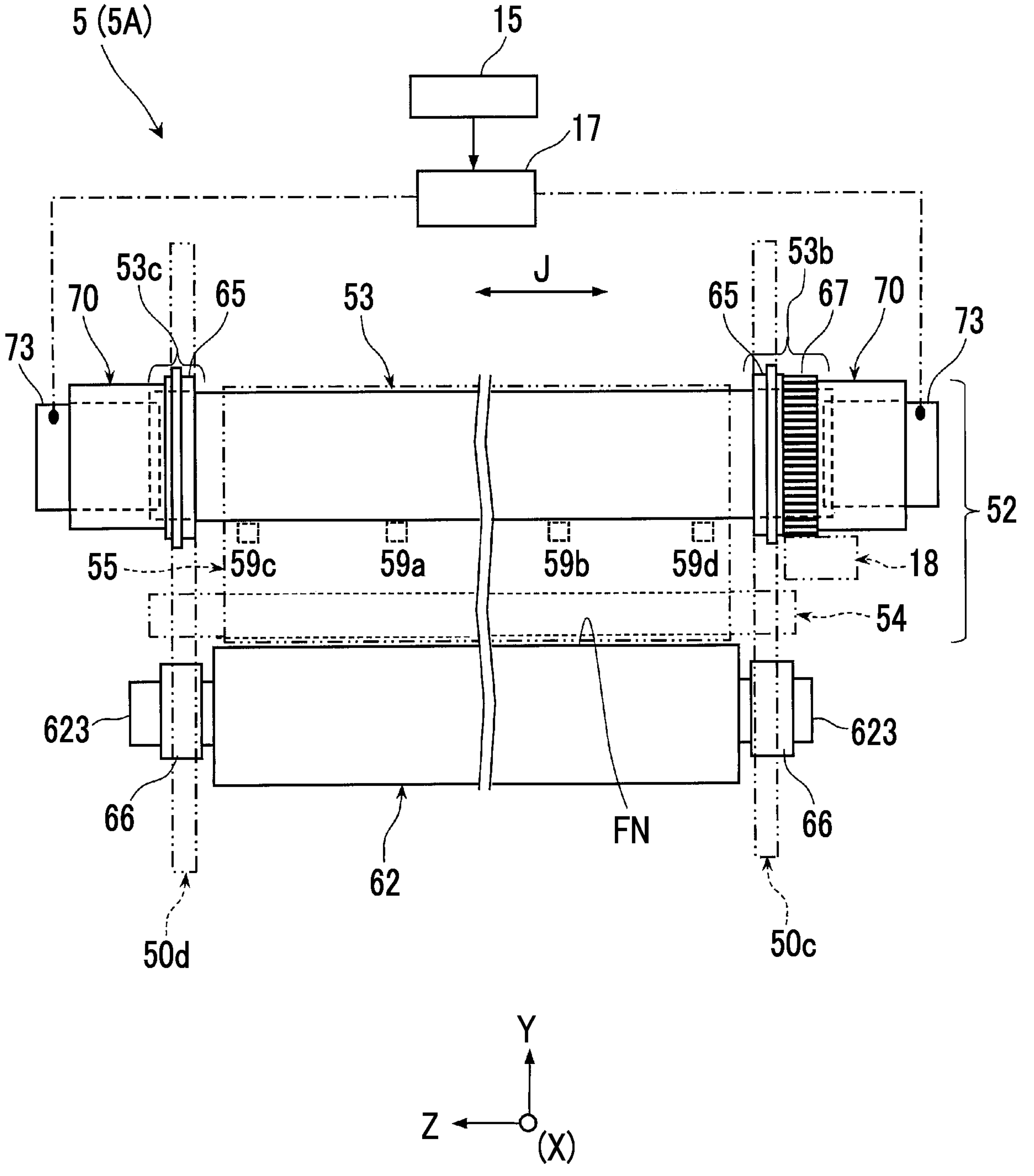
FIG. 3 is a schematic diagram of a part of the fixing device shown in FIG. 2.

The fixing device 5A according to the first exemplary embodiment has a configuration in which a belt-nip type heating unit 52 is applied as the heating rotor 51 and a roller type pressure roller 62 is applied as the pressure rotor 61 as shown in FIGS. 2, 3, and the like.

The heating unit 52 is formed as a unit that comprises a heating roller 53, a support member 54, a fixing belt 55, an adjustment support roller 56, and the like.

Figure 4A:
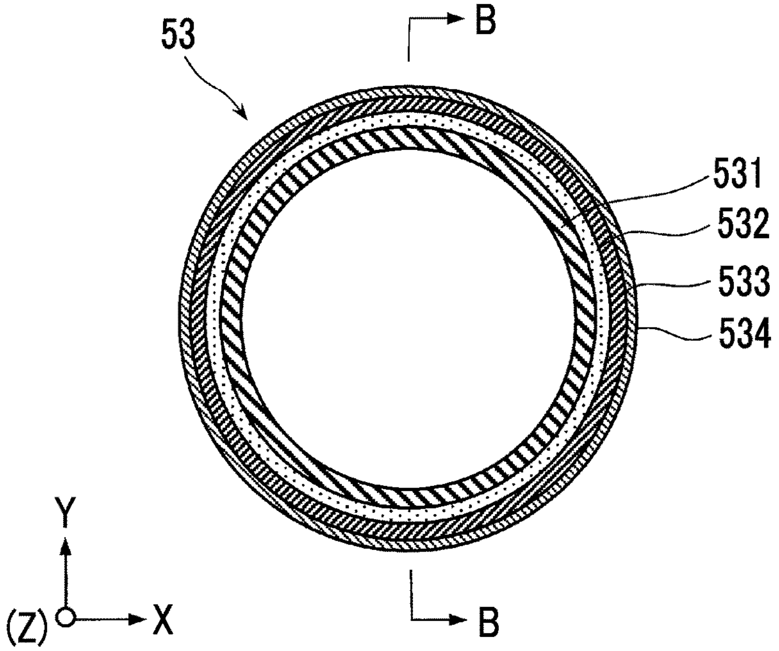
FIG. 4A is a schematic cross-sectional view of a heating roller.
Figure 4B:
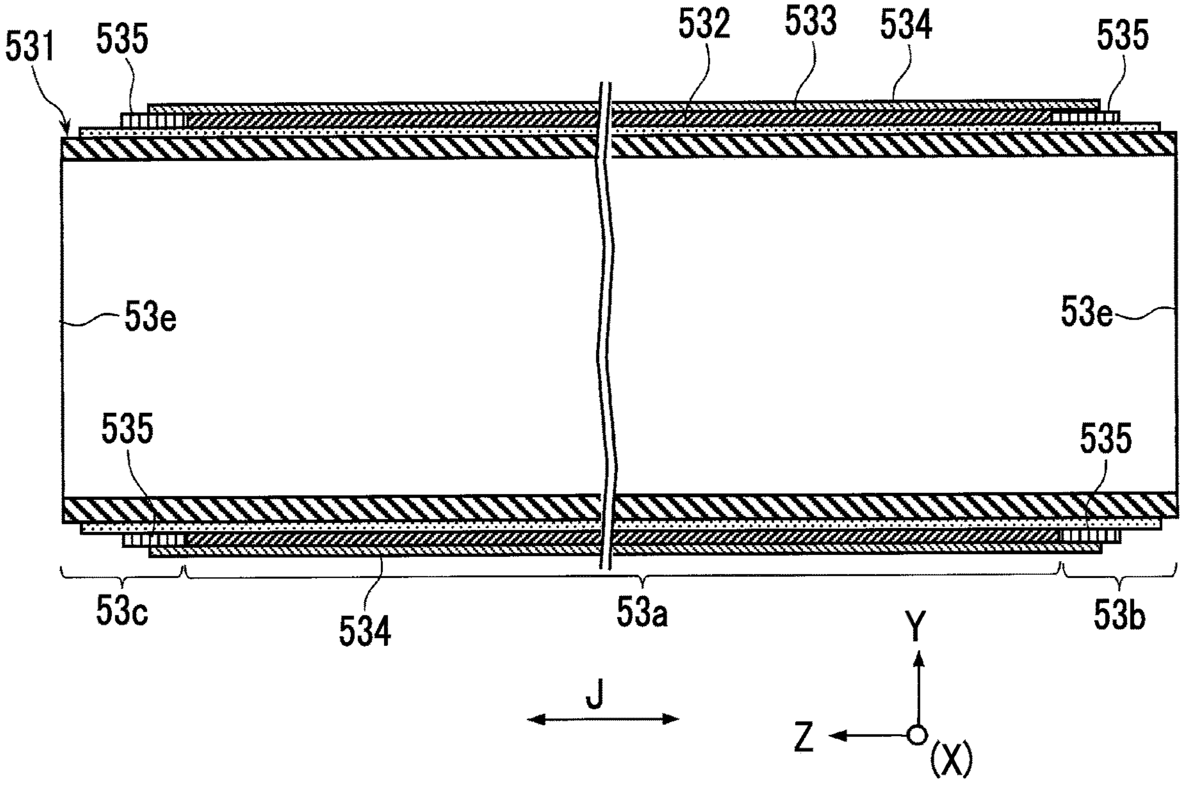
FIG. 4B is a schematic cross-sectional view taken along line B-B of FIG. 4A.

First, the heating roller 53 is a roller body having a structure in which an electrical insulating layer 532, a resistance heating layer 533 generating heat via the flow of a current, and a surface layer 534 are laminated in this order on the outer peripheral surface of a cylindrical roller base 531 as shown in FIG. 4.

The roller base 531 is a cylindrical body that is made of a metal material, such as aluminum or iron, and has a thickness of about 0.2 mm to 1.0 mm.

The electrical insulating layer 532 is an insulating film that is made of a material having an electrical insulating property (non-conductivity), such as polyimide or polyetheretherketone (PEEK). The electrical insulating layer 532 is formed over substantially the entire outer peripheral surface of the roller base 531.

The resistance heating layer 533 is a layer that generates heat via the flow of a current.

The resistance heating layer 533 is formed on a portion of the heating roller 53 wider than the dimension of the maximum width in a case where the recording medium 9A is transported. In other words, the resistance heating layer 533 is formed on a middle portion 53*a* of the outer peripheral surface of the roller base 531 except for both end portions 53*b* and 53*c* of the heating roller 53 in an axial direction J as shown in FIG. 4. Both the end portions 53*b* and 53*c* are portions (areas) that have a required width toward the middle from roller ends 53*e* of the heating roller 53 in the axial direction J, respectively.

Further, the resistance heating layer 533 is formed as a layer or a film made of, for example, a material, such as silver palladium, gold palladium, or a carbon-metal filler mixture. Incidentally, the resistance heating layer 533 is formed by a mold casting-coating method in terms of, for example, making a thickness uniform.

In addition, as shown in FIG. 4 and the like, the resistance heating layer 533 is adapted so that a current flows in the resistance heating layer 533 through power feed layers 535, which are provided in a circumferential direction orthogonal to the axial direction J of the heating roller 53 at both the end portions 53*b* and 53*c* of the heating roller 53 to have a required width, during power feed. The power feed layer 535 is formed as a layer or a film made of, for example, a material, such as beryllium copper or silver paste.

The surface layer 534 is a layer that has non-conductivity and good thermal conductivity and also has protective performance for protecting the resistance heating layer 533. For example, it is preferable that the surface layer 534 is a layer having a tack force for transmitting rotational power to the fixing belt 55 or wettability with respect to a lubricant to be described later, and is made of a material having low releasability from this viewpoint. For example, a material, such as polyimide or polyetheretherketone (PEEK), is applied as the material having low releasability.

Further, as shown in FIG. 3, connection power feeders 70, which are connected to both the end portions 53*b* and 53*c* of the heating roller 53 in the axial direction J and feeds power to the resistance heating layer 533, are mounted on the heating roller 53, respectively. The connection power feeders 70 are connected to a power supply device 17, and a required current or the like is supplied to the connection power feeders 70 from the power supply device 17 in a period in which heating is required.

The details of the connection power feeder 70 will be described later.

Further, as shown in FIG. 3, bearings 65 are disposed at a part of both the end portions 53*b* and 53*c* of the heating roller 53 in the axial direction J. Accordingly, the heating roller 53 is rotatably mounted on the upper portions of side support portions 50*c* and 50*d* of the housing 50 via the bearings 65.

Furthermore, as shown in FIG. 3, a gear 67 as an example of a power receiving component is disposed at a part of one end portion 53*b* of the heating roller 53. Further, a transmission gear 18, which transmits rotational power generated from a rotational drive device (not shown), meshes with and is connected to the gear 67. Accordingly, the heating roller 53 is adapted to be rotationally driven in a predetermined direction B in a case where rotational power transmitted from the transmission gear 18 is input to the heating roller 53 via the gear 67.

Next, the fixing belt 55 is heated by the heating roller 53, and is in contact with the surface of the recording medium 9A to which the toner image 92 is transferred at the fixing processing portion FN to heat the recording medium 9A.

An endless belt for heat conduction that has flexibility and heat resistance and has, for example, a laminated structure in which an elastic layer and a release layer are formed in this order on the outer peripheral surface of a cylindrical belt base is applied as the fixing belt 55. A cylindrical member made of a synthetic resin, such as polyimide or polyamide, is used as the belt base. A layer made of an elastic material, such as silicone rubber, is formed as the elastic layer. A layer made of a resin material, such as polytetrafluoroethylene, is formed as the release layer.

Further, the fixing belt 55 is mounted to be wound around the support member 54 and the adjustment support roller 56 in addition to the heating roller 53 as shown in FIG. 2, and is adapted to be rotated in a direction indicated by an arrow B in this state.

The support member 54 is a member that is disposed to be in contact with the inner peripheral surface of the fixing belt 55 and supports and forms the fixing processing portion FN where heating processing is performed. The fixing processing portion FN is a processing portion for heating and fixing that is formed on a portion of the outer peripheral surface of the fixing belt 55 supported by the support member 54.

The support member 54 is formed as a structure that includes a plate-like support body disposed to extend in parallel to the axial direction J of the heating roller 53 and having a hollow structure and a pad member mounted on a surface portion of the support body being in contact with the inner peripheral surface of the fixing belt 55.

Further, the support member 54 is disposed such that portions of both end portions of the support body protruding outward from both the end portions of the fixing belt 55 are mounted on the side support portions 50*c* and 50*d* or the like of the housing 50.

The adjustment support roller 56 is a roller that performs adjustment for keeping the winding state of the fixing belt 55 in a desired form while applying required tension and for stabilizing the rotational traveling state of the fixing belt 55.

Further, a lubricant coating device 57 for coating the inner peripheral surface of the fixing belt 55 with a lubricant and temperature sensors 59 for measuring the surface temperatures of the heating roller 53 are disposed in the heating unit 52 as shown in FIG. 2.

Furthermore, a plurality of temperature sensors 59*a* to 59*d* are arranged at predetermined positions (for example, a region on the middle side and regions on the end portion sides) in a heating region of the heating roller 53 in the axial direction J in the heating unit 52 as shown in FIG. 3, measure the surface temperatures in a plurality of regions of the heating region, and transmit measurement results thereof to a control device 15. Meanwhile, the control device 15 controls the operation, such as output, of the power supply device 17 with reference to the measurement results.

Accordingly, in the heating unit 52, the heat generation state of the heating roller 53 is adjusted and the heating state at the fixing processing portion FN is finally adjusted.

Next, the pressure roller 62 is a roller body having a structure in which an elastic release layer 622 is provided on the outer peripheral surface of a columnar or cylindrical roller base 621 as shown in FIG. 2.

As shown in FIG. 2, the pressure roller 62 is rotatably mounted on the lower portions of the side support portions 50*c* and 50*d* of the housing 50 at a position facing the support member 54 of the heating unit 52 via bearings 66 that are mounted on shaft portions 623 protruding from both end portions of the roller base 621.

Further, the pressure roller 62 is mounted on the side support portions 50*c* and 50*d* so that the bearings 66 can be displaced in a direction where the bearings 66 approach and are separated from the support member 54, and predetermined pressure toward the support member 54 is applied to the bearings 66 by biasing members, such as springs (not shown). Accordingly, the pressure roller 62 is adapted to cause the fixing belt 55 to pass while pushing the fixing belt 55 against (the pad member of) the support member 54 with a predetermined pressure.

In a period in which the fixing operation or the like is to be performed in the fixing device 5A, the resistance heating layer 533 of the heating roller 53 of the heating unit 52 generates heat via the flow of a current and starts to generate heat to keep the heating roller 53 at a required temperature and the heating roller 53 starts to be heated by the generated heat.

Further, in the fixing device 5A, the heating roller 53 starts to rotate in a direction indicated by an arrow B, the pressure roller 62 starts to be rotated in the direction indicated by the arrow C by this rotational drive, and the fixing belt 55 starts to rotate in the direction indicated by the arrow B that is the same as the direction of the heating roller 53.

Accordingly, the fixing belt 55 is rotated to pass through the fixing processing portion FN while being heated by the heating roller 53, so that the fixing device 5A is in a state where the fixing operation can be performed.

More Detailed Configuration of Heating Device

In the fixing device 5A, as shown in FIG. 3, the bearings 65 are disposed at portions of both the end portions 53*b* and 53*c* of the heating roller 53 that are closer to the inside than the connection power feeders 70 in the axial direction J (positions near the middle in the axial direction J).

For example, a rolling bearing, such as a ball bearing, is applied as the bearing 65. In a case where a ball bearing is applied as the bearing 65, for example, it is preferable to use highly heat-resistant oil as lubricating oil to be filled in the ball bearing in terms of ensuring the rolling of balls well over a long period of time even though a large amount of heat is transferred from the heating roller 53.

Figure 13:
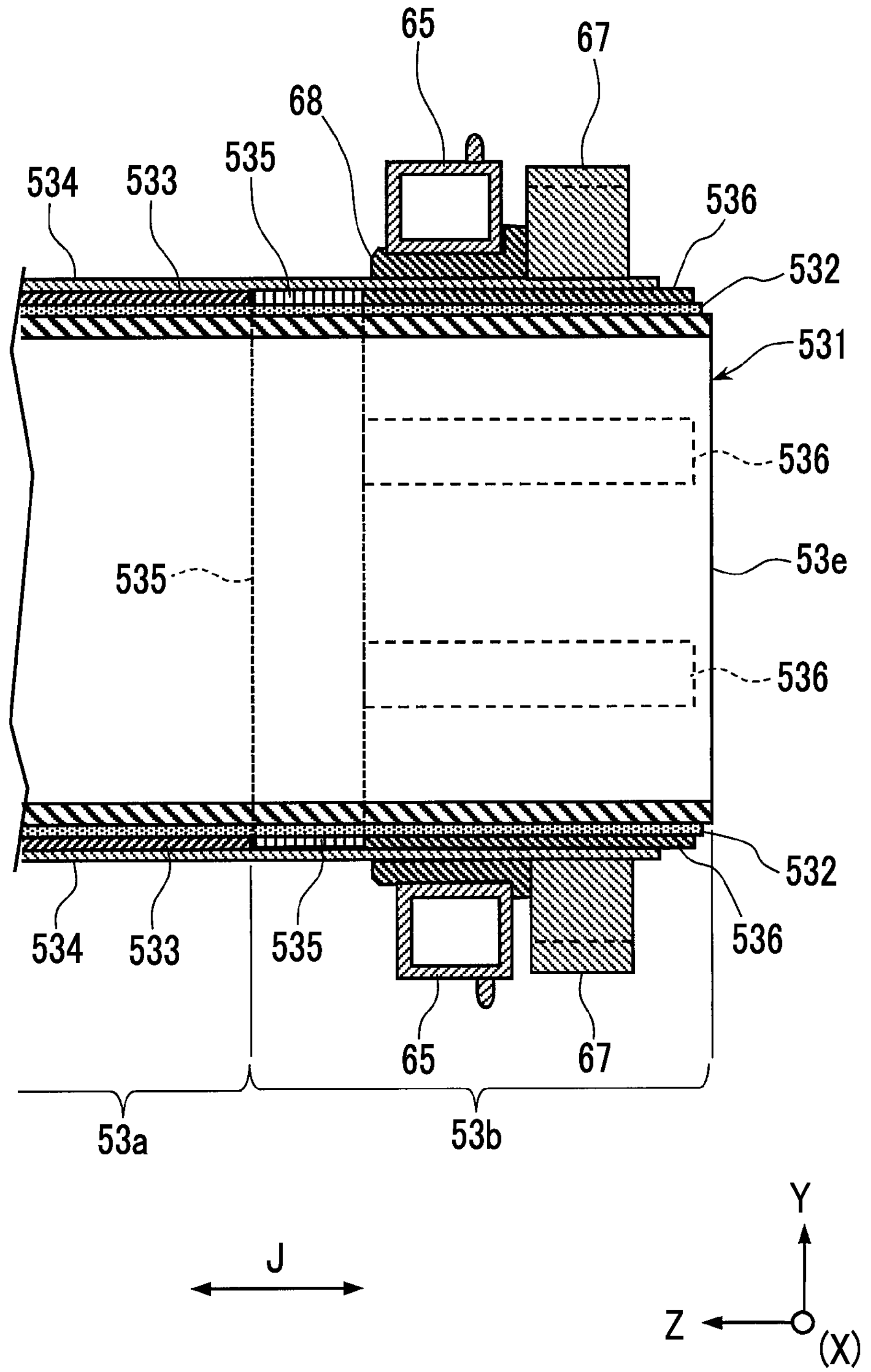
FIG. 13 is a schematic cross-sectional view showing a part of the configuration of the heating roller.

Further, as shown in FIG. 13, the bearing 65 is disposed at a portion of each of both the end portions 53*b* and 53*c* of the heating roller 53 that is closer to the outside than the resistance heating layer 533 in the axial direction J (a position near a roller end 53*e*). The bearing 65 of the first exemplary embodiment is mounted to have a positional relationship in which the power feed layer 535 is interposed between the resistance heating layer 533 and the bearing 65 in the axial direction J of the heating roller 53.

Furthermore, the bearing 65 is mounted on each of both the end portions 53*b* and 53*c* of the heating roller 53 so as to be press-fitted with a resin member 68 interposed therebetween. The resin member 68 is an annular member that can be fitted to each of both the end portions 53*b* and 53*c* of the heating roller 53 from the outside. Further, the resin member 68 is made of, for example, a resin material, such as polyphenylene sulfide (PPS), polyimide, or PEEK.

Accordingly, a concern that both the end portions 53*b* and 53*c* of the heating roller 53 will be damaged together with the layer, such as the surface layer 534 during the mounting of the bearings 65 is reduced in the fixing device 5A as compared to a case where the bearings 65 are mounted on both the end portions 53*b* and 53*c* of the heating roller 53 without the resin members 68 interposed therebetween.

Figure 5:
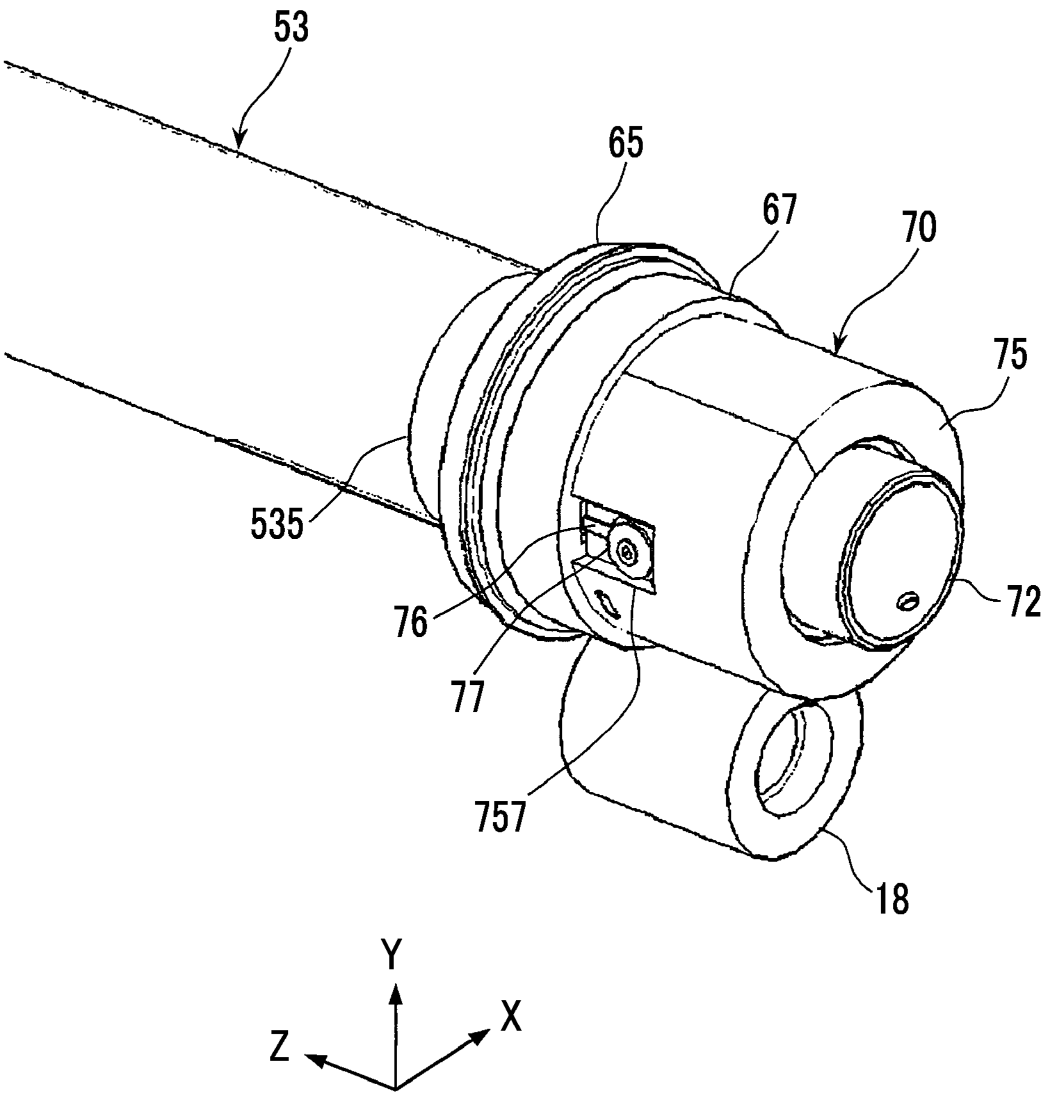
FIG. 5 is a perspective view showing a state where a connection power feeder is mounted on one end side of the heating roller.
Figure 10:
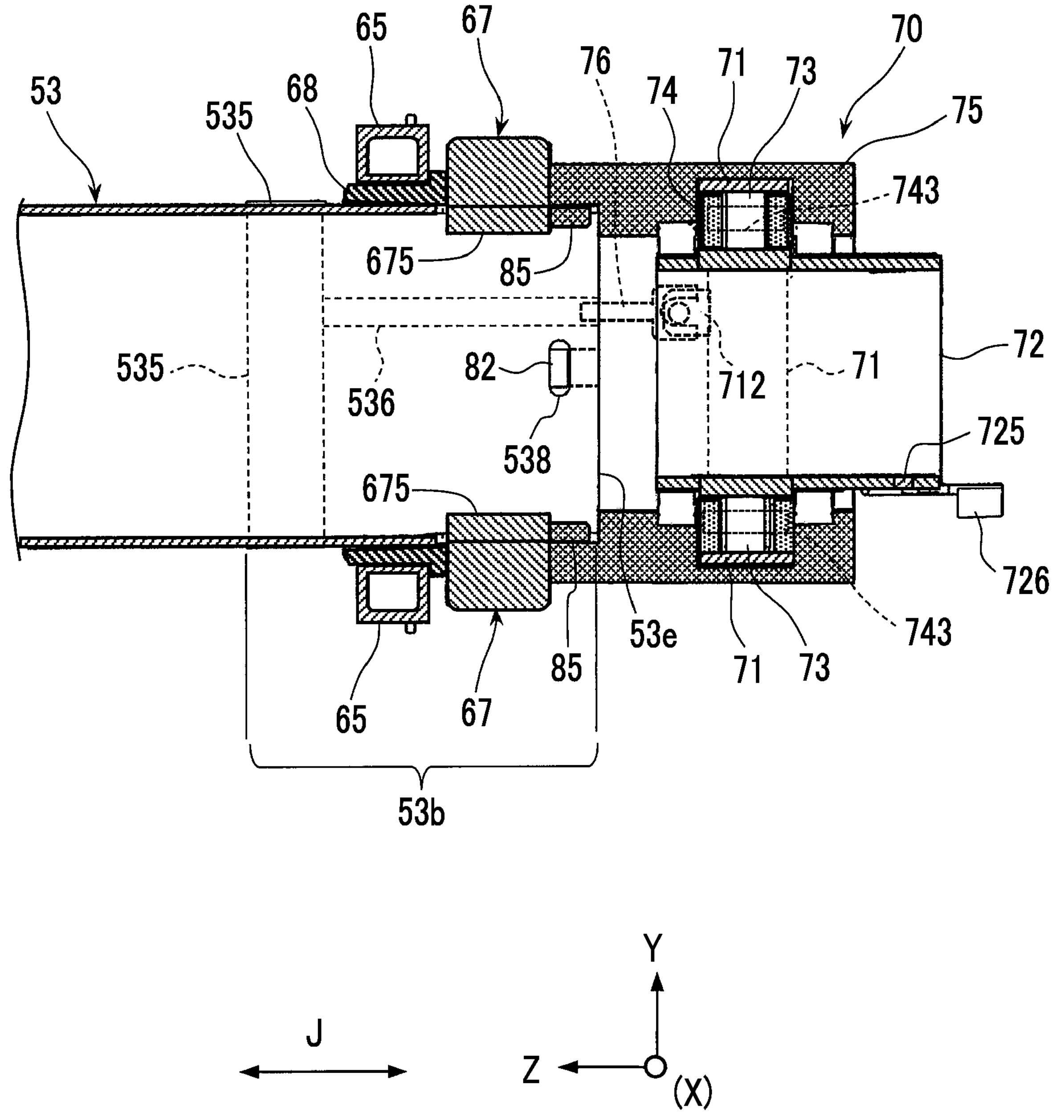
FIG. 10 is a schematic cross-sectional view showing a state where the connection power feeder is mounted on one end side of the heating roller shown in FIG. 5.

Further, in the fixing device 5A, as shown in FIGS. 3, 5, 10, and the like, the gear 67 is disposed at a portion of the end portion 53*b* of the heating roller 53 that is closer to the outside than the bearing 65 and closer to the inside than the connection power feeder 70 in the axial direction J.

Figure 7:
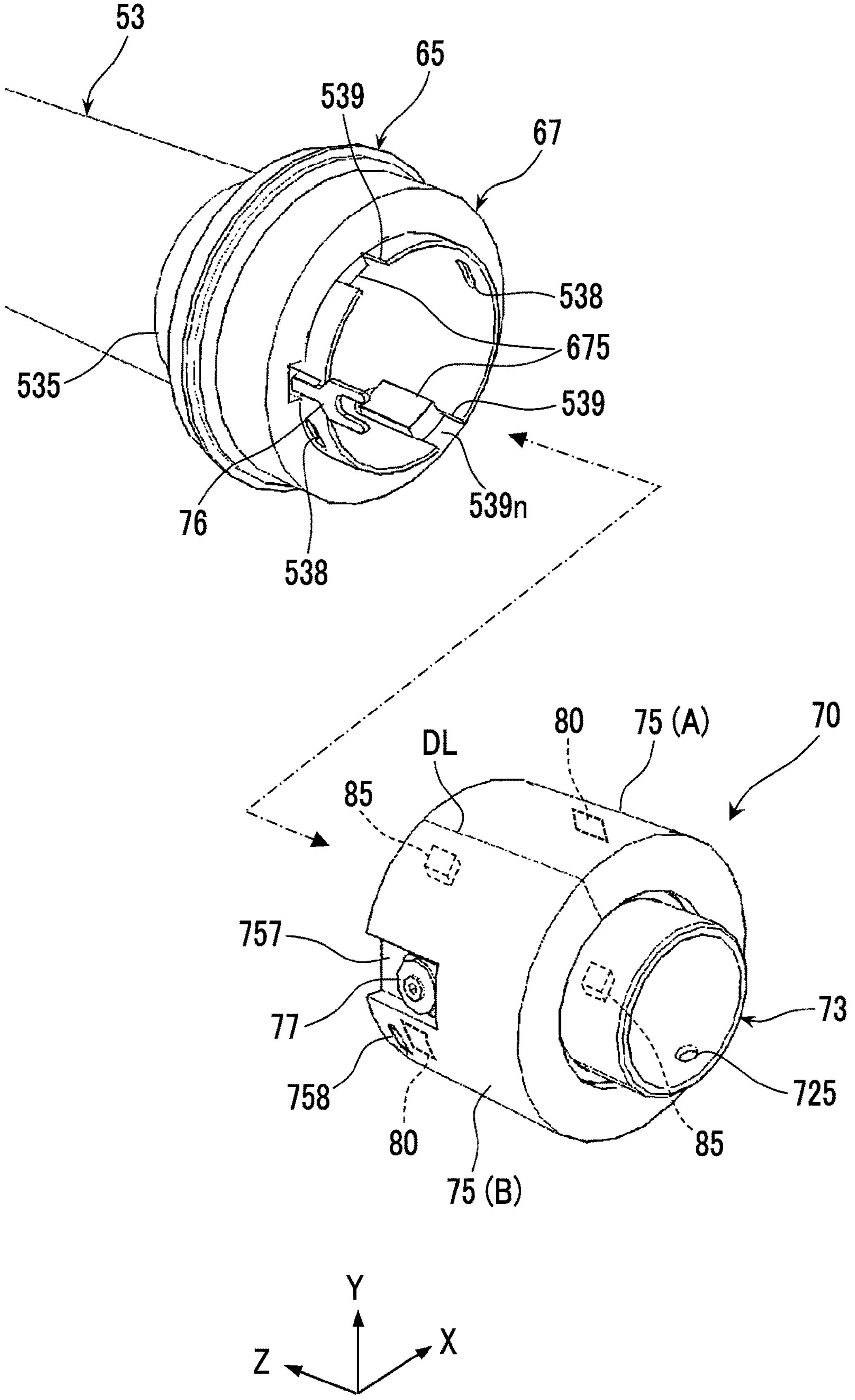
FIG. 7 is a perspective view in a case where the heating roller and the connection power feeder shown in FIG. 5 are separated from each other.
Figure 11:
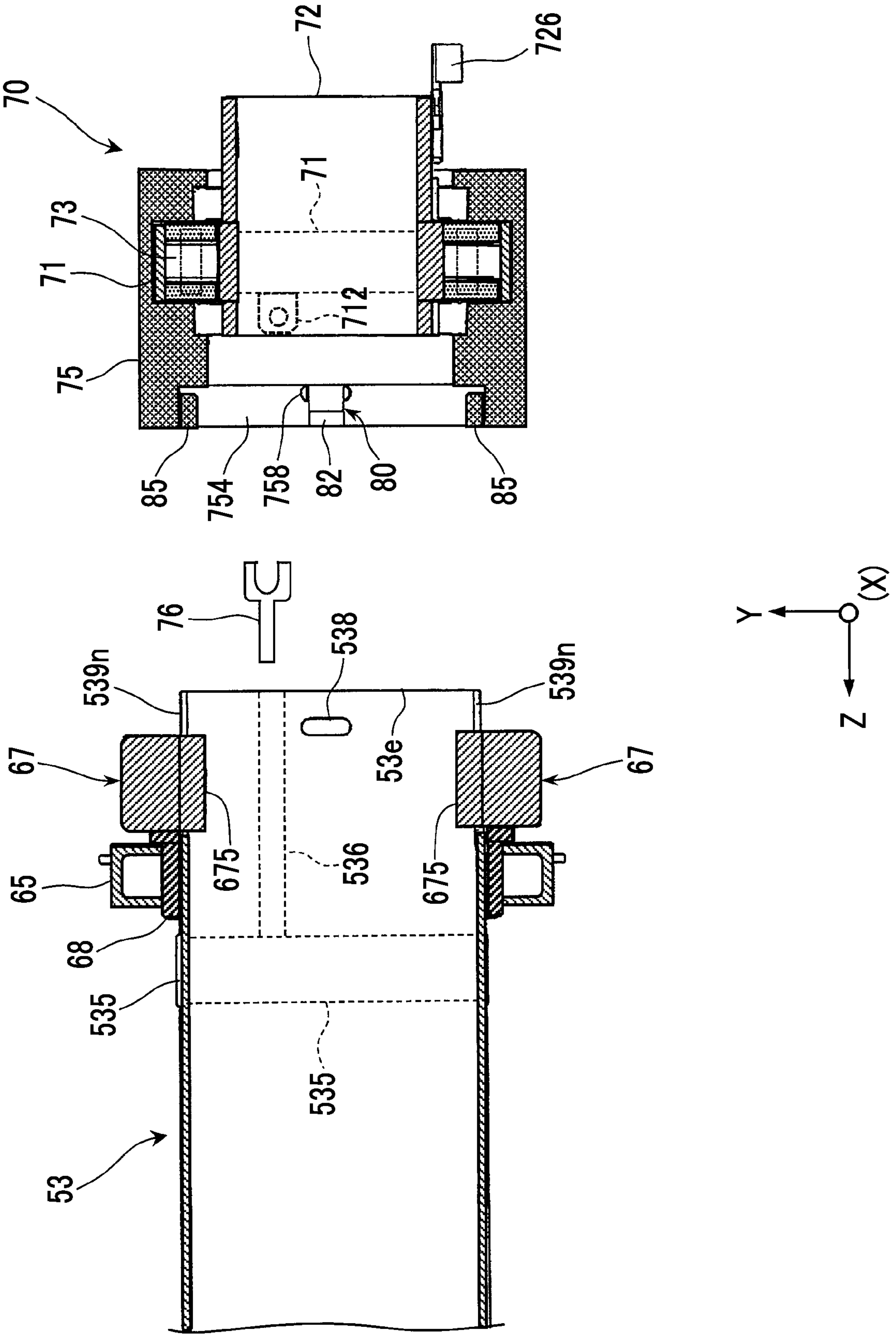
FIG. 11 is a schematic cross-sectional view in a case where the heating roller and the connection power feeder shown in FIG. 5 are separated from each other.

An annular member having gear teeth formed on the outer peripheral surface thereof is applied as the gear 67. As shown in FIGS. 7, 11, 12B, and the like, fixing keys 675 for fixing the position of the end portion 53*b* of the heating roller 53 in the circumferential direction are provided on the inner peripheral surface of the gear 67. The fixing keys 675 are formed as rectangular parallelepiped protrusions protruding from the inner peripheral surface of the gear 67 toward the center of rotation. Two fixing keys 675 are provided in the first exemplary embodiment, but the number of the fixing keys 675 is not particularly limited.

On the other hand, the end portion 53*b* of the heating roller 53 is provided with keyways 539 to which the fixing keys 675 are to be fitted as shown in FIGS. 7, 12B, and the like. Each keyway 539 is formed as a notched groove that is cut in the axial direction J from the roller end 53*e* of the end portion 53*b* of the heating roller 53 to have a required width and a required length.

The gear 67 is mounted to be fitted to the end portion 53*b* of the heating roller 53 and the fixing keys 675 are fitted into the keyways 539, so that the gear 67 is mounted on the heating roller 53.

Next, the connection power feeder 70 to be mounted on each of both the end portions 53*b* and 53*c* of the heating roller 53 of the fixing device 5A will be described.

As shown in FIGS. 6 to 11, and the like, the connection power feeder 70 includes an annular frame 71, a power feed shaft 72, a plurality of rolling bodies 73, and a non-conductive cover 75.

Figure 6:
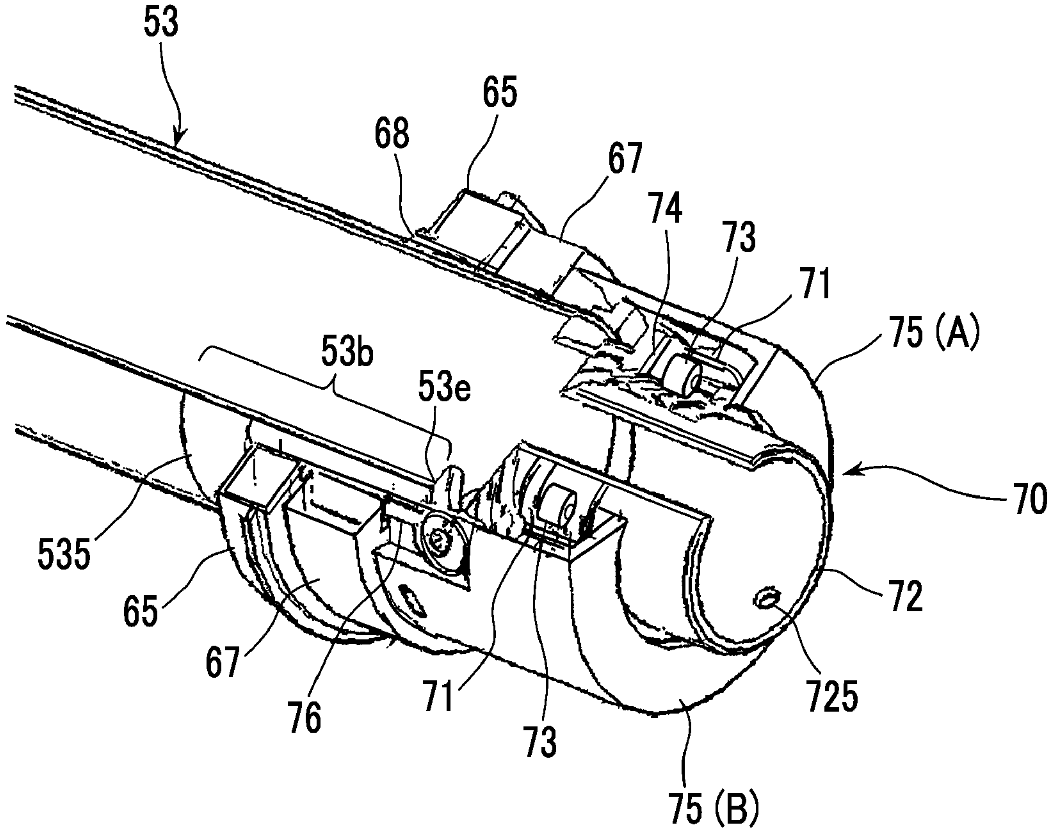
FIG. 6 is a perspective view showing a state where the heating roller and the connection power feeder shown in FIG. 5 are partially cut.

The annular frame 71 is a component that is disposed to be concentric with the heating roller 53 and is conductively connected to the resistance heating layer 533 as shown in FIGS. 6, 10, 11, and the like.

The frame 71 is disposed with an interval from each of both the end portions 53*b* and 53*c* of the heating roller 53. The frame 71 is formed as a component that has a shape including a body portion 711 and a protruding connection portion 712.

The body portion 711 is a portion that is formed in an annular shape having a diameter (outer diameter) larger than the diameter of the heating roller 53 and formed in a shape including an outer peripheral surface 71*a* and an inner peripheral surface 71*b* having a predetermined width.

The protruding connection portion 712 is a portion that is formed at a part of the body portion 711 in the circumferential direction to have a shape protruding toward each of both the end portions 53*b* and 53*c* of the heating roller 53.

Further, as shown in FIG. 10, the protruding connection portion 712 is used as a portion on which one end portion of a conductive elastic member 76 is to be mounted. The conductive elastic member 76 connects the frame 71 to (an extension layer 536 of) the power feed layer 535 of the heating roller 53 to allow a current to flow. For example, a leaf spring having conductivity or the like is used as the conductive elastic member 76.

The frame 71 is formed as a member having conductivity by using, for example, a material, such as pure copper, brass, phosphor bronze, or nickel. The frame 71 may be plated with gold or tin.

The power feed shaft 72 is a shaft of which a portion 721 is disposed in the frame 71 as shown in FIGS. 6, 8, 10, 11, and the like and which feeds power.

The power feed shaft 72 is formed as a shaft that has the shape of a cylinder having an outer diameter smaller than the inner diameter of the frame 71.

The power feed shaft 72 is disposed in a state where the portion 721 of the power feed shaft 72 is concentrically present in the internal space of the frame 71. On the other hand, the power feed shaft 72 is disposed in a state where the other portion 722 excluding the portion 721 of the power feed shaft 72 is exposed to the outside. Further, a part of the other portion 722 of the power feed shaft 72 is fixed to and mounted on, for example, the side support portions 50*c* and 50*d* of the housing 50. Accordingly, the power feed shaft 72 is used as a fixed shaft (non-rotating shaft).

Figure 9A:
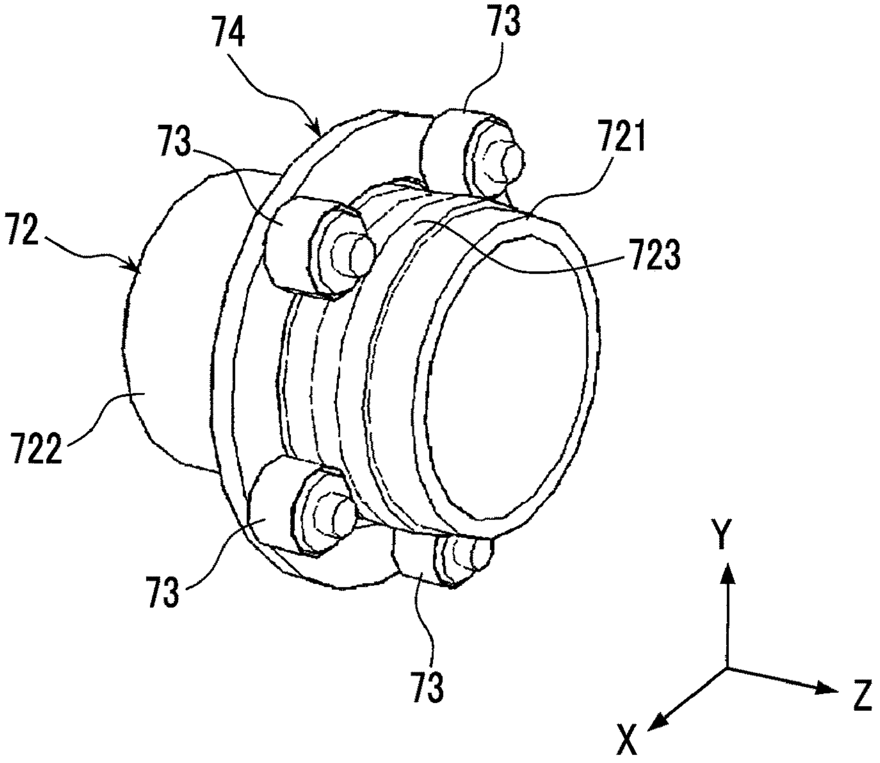
FIG. 9A is a perspective view of components remaining in a case where one component (frame) is removed from the internal components shown in FIG. 8B.
Figure 9B:
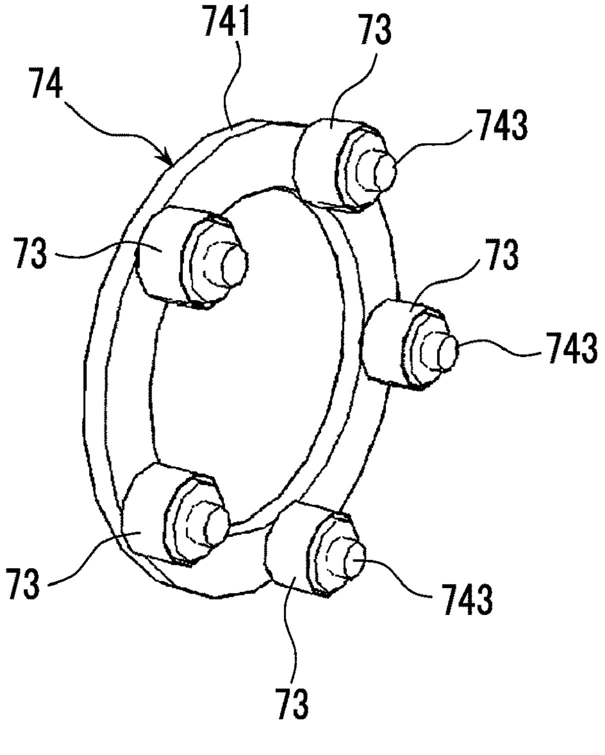
FIG. 9B is a perspective view of components remaining in a case where one component (power feed shaft) is removed from the components shown in FIG. 9A.

As shown in FIGS. 9A, 9B, and the like, a large-diameter portion 723 having a diameter larger than the diameters of other portions is formed on the portion 721 of the power feed shaft 72. The large-diameter portion 723 is a portion that is formed to cause the rolling bodies 73 to stably move rotationally without being shifted in the axial direction.

The power feed shaft 72 is formed as a shaft having conductivity by using, for example, a material, such as pure copper, brass, phosphor bronze, or nickel. The power feed shaft 72 may be plated with gold or tin.

A power feed current or the like output from the power supply device 17 is transmitted to the other portion 722 of the power feed shaft 72. As shown in FIGS. 10, 11, 14B, and the like, the power feed shaft 72 is adapted so that, for example, a power feed current or the like is transmitted to a mounting hole 725 provided in the other portion 722 of the power feed shaft 72 via a connection terminal 726.

The plurality of rolling bodies 73 are components that roll while being in conductive contact with the inner peripheral surface 71*b* of the frame 71 and an outer peripheral surface 72*a* of the power feed shaft 72.

Five roller-shaped members are applied as the rolling bodies 73 of the first exemplary embodiment. Since the rolling bodies 73 are arranged and roll in a gap between the inner peripheral surface 71*b* of the frame 71 and the outer peripheral surface 72*a* of the power feed shaft 72, the rolling bodies 73 are formed as roller-shaped or spherical members having substantially the same outer diameter as the dimension of the gap. The rolling body 73 is formed as a component of which at least the outer peripheral surface has conductivity.

Further, the five rolling bodies 73 are arranged at regular intervals and rotatably held on a holding body (retainer) 74 as shown in FIGS. 9A, 9B, and the like.

The holding body 74 is a member that has a shape including a ring-shaped body portion 741 and five rotating shafts 743. The body portion 741 is formed in the shape of a ring that has an outer diameter smaller than the inner diameter of the frame 71 and an inner diameter larger than the outer diameter of the power feed shaft 72. The five rotating shafts 743 are formed as shafts for the rolling bodies 73 that are erected on one surface of the body portion 741 at positions corresponding to the vertices of a regular pentagon.

Further, the holding body 74 holds the rolling bodies 73 on the rotating shafts 743 to allow the rolling bodies 73 to be rotatable. The holding body 74 including the rotating shafts 743 is formed as a non-conductive component.

The holding body 74 is disposed to be present in the frame 71. Further, since the rolling bodies 73 are present and held between the frame 71 and the power feed shaft 72 in the completed state of the connection power feeder 70, the holding body 74 is kept in a non-contact state where the holding body 74 is not in contact with the frame 71 and the power feed shaft 72.

The non-conductive cover 75 is a non-conductive cover component that holds and covers the frame 71 and the rolling bodies 73 in a state where the portion 722 excluding the portion 721 of the power feed shaft 72 is exposed.

The cover 75 is adapted to be divided into, for example, two divided cover parts 75A and 75B, and the divided cover parts 75A and 75B are fixed and united to each other by fixing means (not shown), such as screws, in use. A line DL shown in FIG. 7 is a dividing boundary line in a case where the two divided cover parts 75A and 75B are united to each other.

Figure 8A:
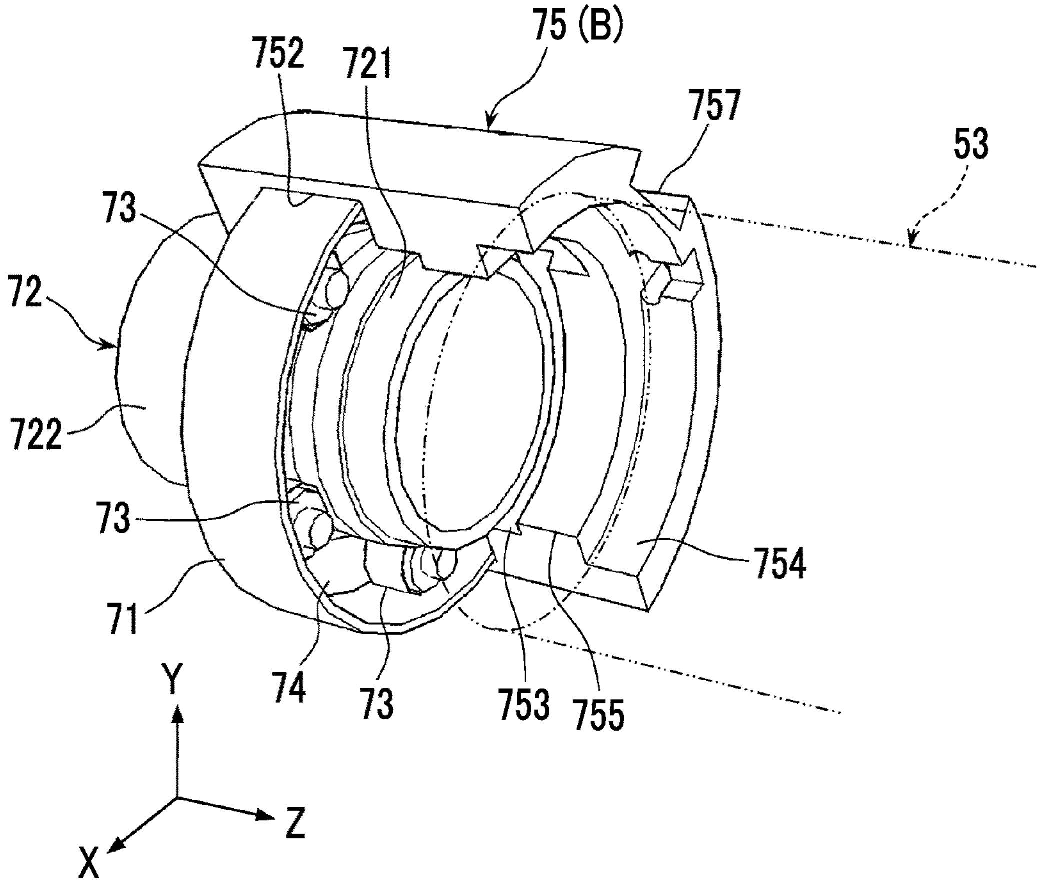
FIG. 8A is a perspective view showing a state where the connection power feeder is partially cut.

Further, the cover 75 is formed in a cylindrical shape as a whole. As shown in FIG. 8A, a frame holding portion 752, a shaft holding portion 753, a roller holding portion 754, and a boundary portion 755 are provided in the cover 75. The frame 71 is fitted into and held by the frame holding portion 752, an end portion of the portion 721 of the power feed shaft 72 is fitted into and held by the shaft holding portion 753, an end portion of each of both the end portions 53*b* and 53*c* of the heating roller 53 is fitted into and held by the roller holding portion 754, and the boundary portion 755 is provided between the shaft holding portion 753 and the roller holding portion 754 and is narrow and has a small diameter.

Furthermore, as shown in FIG. 7 and the like, a mounting recess 757 in which the conductive elastic member 76 is connected to and mounted on the protruding connection portion 712 of the frame 71 and is housed is provided on the outer peripheral portion of the cover 75.

A fastener 77 where the elastic member 76 to be connected to a member, such as a screw, conductively connected to the protruding connection portion 712, is mounted and fixed is disposed in the mounting recess 757. A leaf spring of which an end portion to be mounted on the fastener 77 is bifurcate is applied as the conductive elastic member 76 of the first exemplary embodiment.

Further, for the attachable and detachable mounting of the connection power feeder 70 on each of both the end portions 53*b* and 53*c* of the heating roller 53, the cover 75 of the connection power feeder 70 is provided with mounting portions 80 that are an example of portions including projecting portions as shown in FIGS. 11, 12, and the like.

Furthermore, locking holes 538 to which the mounting portions 80 are to be locked are provided at each of both the end portions 53*b* and 53*c* of the heating roller 53 to correspond to the mounting portions 80.

Figure 12A:
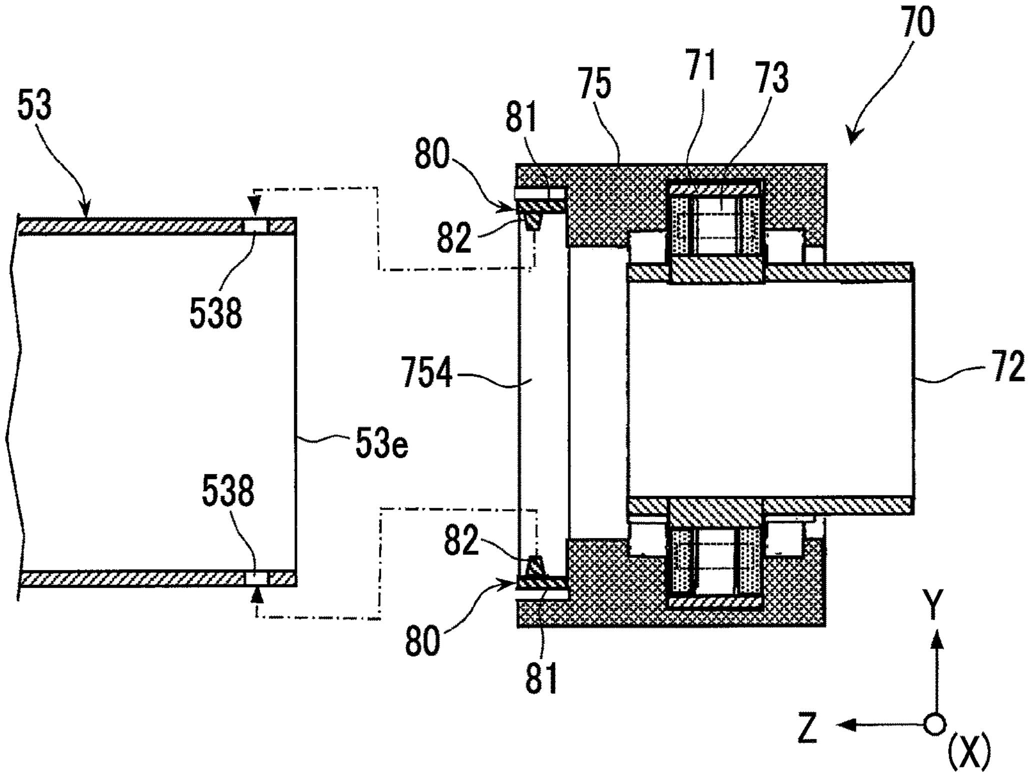
FIG. 12A is a schematic cross-sectional view showing a part of a configuration of the heating roller and the connection power feeder.
Figure 12B:
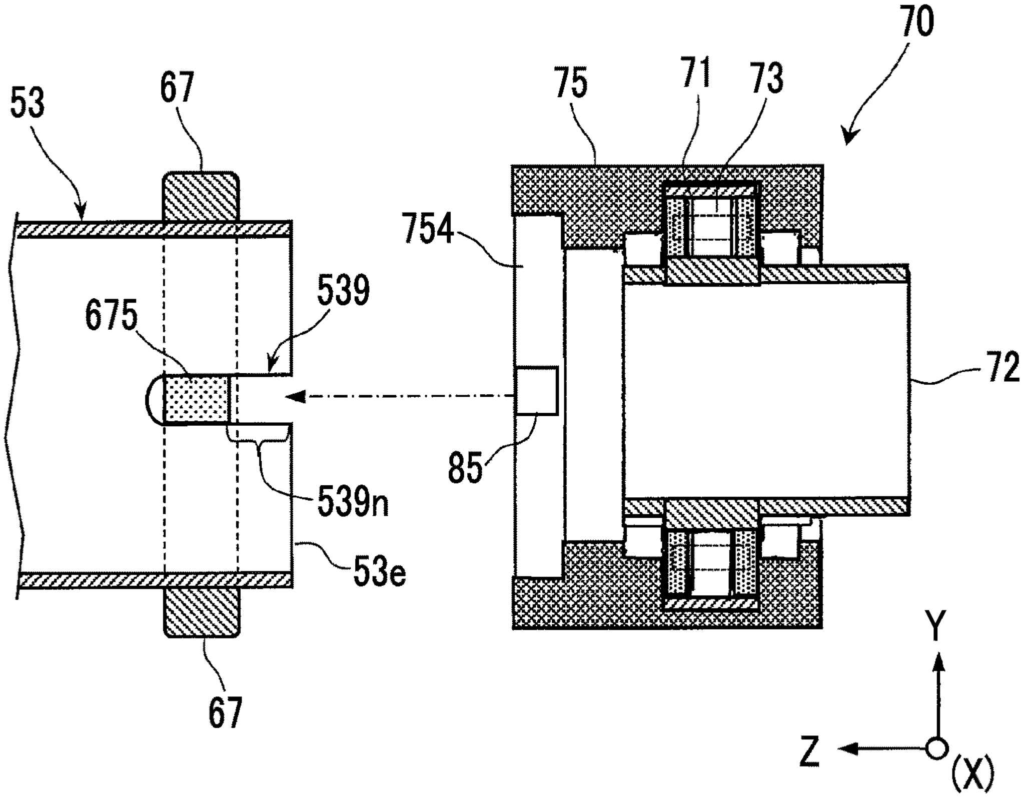
FIG. 12B is a schematic cross-sectional view showing a part of another configuration of the heating roller and the connection power feeder.

As shown in FIG. 12A, 12B, and the like, each mounting portion 80 is formed as a protruding structural portion including a plate-like body portion 81 that is disposed at a predetermined portion of the roller holding portion 754 of the cover 75 and protrudes outward and a first projecting portion 82 that protrudes toward the inside of the cover (a side opposite to the outer peripheral surface of the cover) at a distal end portion of the body portion 81. The body portion 81 has a gap on a side opposite to the side where the first projecting portion 82 is provided, so that the body portion 81 can be elastically deformed. Further, the first projecting portion 82 is a portion that is formed in a shape protruding to be fitted into the locking hole 538 of each of both the end portions 53*b* and 53*c* of the heating roller 53.

The mounting portions 80 may be formed integrally with the cover 75 or may be produced as components separate from the cover 75 and mounted on the cover 75.

As shown in FIG. 7, long holes 758 passing through the cover 75 from the outer peripheral surface are provided in the cover 75 near portions where the mounting portions 80 are provided. The long hole 758 is a hole that is used to perform push work in a case where the first projecting portion 82 of the mounting portion 80 is to be fitted into the locking hole 538 of the heating roller 53.

In addition, in order to mount the connection power feeder 70 in a state where the connection power feeder 70 is positioned in the circumferential direction of each of both the end portions 53*b* and 53*c* of the heating roller 53, the cover 75 is provided with second projecting portions 85 to be fitted into the keyways 539 provided at each of both the end portions 53*b* and 53*c* of the heating roller 53 as shown in FIGS. 11, 12A, 12B, and the like as another example of the portions including projecting portions.

Each second projecting portion 85 is formed as a protruding portion that protrudes toward the inside of the cover (a side opposite to the outer peripheral surface of the cover)

at a predetermined portion of the roller holding portion 754 of the cover 75. As shown in FIGS. 7 and 12B, the second projecting portions 85 are formed as protruding portions that have a shape and dimensions allowing the protruding portions to be fitted into surplus portions 539*n* of the keyways 539 remaining after the fixing keys 675 of the gear 67 are fitted into the keyways 539.

On the other hand, as shown in FIG. 13, in the heating roller 53, the power feed layer 535 is provided with a plurality of extension layers 536, which are arranged at intervals in the circumferential direction of the heating roller 53 and extend up to a portion closer to the outside than the bearing 65 in the axial direction J, to allow a current to flow.

The extension layers 536 are formed to extend from the power feed layer 535 through the lower side (inside) of the bearing 65 (actually, the resin member 68) and the gear 67. Four or five extension layers 536 are provided in the first exemplary embodiment, but the number of the extension layers 536 is not limited. The extension layer 536 is made of the same material as the power feed layer 535 or is made of another conductive material.

Further, a non-conductive surface layer is formed on the outer surface side of each extension layer 536. This non-conductive surface layer is made of the same material as the surface layer 534, but may be made of another non-conductive material.

One end of the conductive elastic member 76 disposed between the extension layer 536 and the frame 71 of the connection power feeder 70 is conductively connected to at least one of the extension layers 536.

The connection power feeder 70 is assembled in, for example, the following procedure.

First, the frame 71 is disposed to be fitted around the plurality of rolling bodies 73 held by the holding body 74. Further, the portion 721 of the power feed shaft 72 is fitted into and disposed in a space inside the plurality of rolling bodies 73 held by the holding body 74. This assembly work may be performed in the reverse order or at the same time.

Figure 8B:
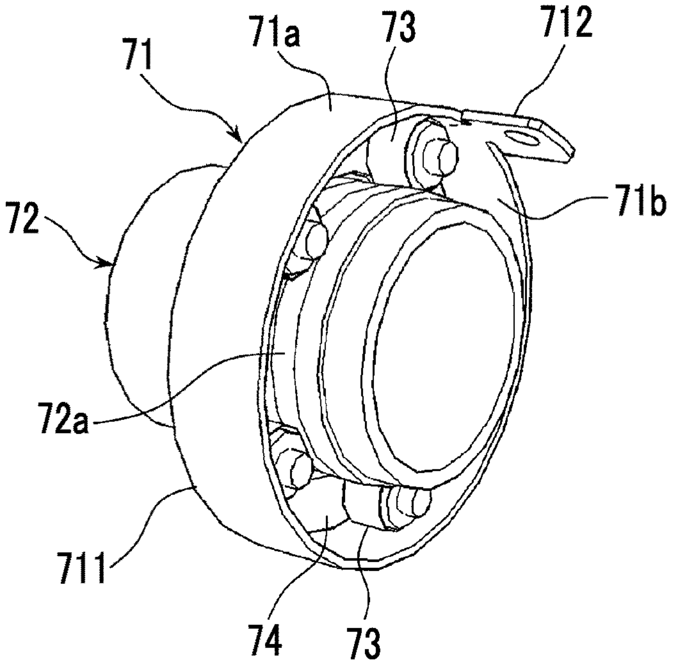
FIG. 8B is a perspective view of internal components in a case where one component (cover) of the connection power feeder is removed.

A subassembly in which the plurality of rolling bodies 73 are present in a space between the frame 71 and the power feed shaft 72 and can move rotationally while being in contact with the inner peripheral surface 71*b* of the frame 71 and the outer peripheral surface 72*a* of the power feed shaft 72 as shown in FIG. 8B is obtained from this assembly work.

Then, the cover 75 is mounted on the subassembly. After the two divided cover parts 75A and 75B of the cover 75 are temporarily fitted to each other so as to cover the frame 71, the portion 721 of the power feed shaft 72, the rolling bodies 73, and the holding body 74 holding the rolling bodies 73, the two divided cover parts 75A and 75B are joined to each other by fixing means (not shown), such as screws, to be integrated.

As a result, the connection power feeder 70 having an appearance shown in FIG. 7 is obtained.

The connection power feeder 70 is in a state where the other portion 722 other than the portion 721 of the power feed shaft 72 is exposed to the outside without being covered with the cover 75. On the other hand, the connection power feeder 70 is in a state where the frame 71, the portion 721 of the power feed shaft 72, the rolling bodies 73, and the holding body 74 are covered with the cover 75. Further, the connection power feeder 70 is in a state where the frame 71 and the portion 721 of the power feed shaft 72 are held by the frame holding portion 752 and the shaft holding portion 753 of the cover 75, respectively.

In a case where it is assumed that, for example the power feed shaft 72 of the completed connection power feeder 70 is fixed, a structure in which the frame 71 and the cover 75 are rotatable with respect to the power feed shaft 72 with the rolling bodies 73 interposed therebetween is obtained.

Then, as shown in FIGS. 3, 5, and the like, the connection power feeders 70 are mounted on both the end portions 53*b* and 53*c* of the heating roller 53 in the fixing device 5A, respectively.

In this case, as shown in FIGS. 8A, 10, and the like, each of both the end portions 53*b* and 53*c* of the heating roller 53 is inserted into the roller holding portion 754 of the cover 75 in the connection power feeder 70.

At this time, as shown in FIG. 10, the first projecting portions 82 of the mounting portions 80 provided at a part of the roller holding portion 754 of the cover 75 are fitted into and locked to the locking holes 538 provided at each of both the end portions 53*b* and 53*c* of the heating roller 53. Accordingly, the connection power feeders 70 are mounted on both the end portions 53*b* and 53*c* of the heating roller 53, so that the connection power feeders 70 and the heating roller 53 are integrated. Further, the first projecting portions 82 are locked to the locking holes 538, so that the connection power feeders 70 in this case are kept in a state where the connection power feeders 70 are fixed in the circumferential direction and the axial direction J of the heating roller 53.

In this case, as shown in FIG. 10, the second projecting portions 85 provided at a part of the roller holding portion 754 of the cover 75 are fitted into the surplus portions 539*n* of the keyways 539 provided at each of both the end portions 53*b* and 53*c* of the heating roller 53. Accordingly, the connection power feeder 70 is mounted on each of both the end portions 53*b* and 53*c* of the heating roller 53 and is positioned and fixed in the circumferential direction.

Then, in the fixing device 5A, as shown in FIG. 5 and the like, the conductive elastic member 76 is mounted between each of both the end portions 53*b* and 53*c* of the heating roller 53 and the connection power feeder 70.

In this case, one end of the conductive elastic member 76 is in contact with one of the plurality of extension layers 536 of the power feed layer 535 extending up to the vicinity of the roller end 53*e* of each of both the end portions 53*b* and 53*c* of the heating roller 53, and the other end thereof is fixed to the fastener 77 provided in the mounting recess 757 of the cover 75.

Accordingly, (the protruding connection portion 712 of) the frame 71 of the connection power feeder 70 and the extension layer 536 of the power feed layer 535 of the heating roller 53 are conductively connected to each other via the conductive elastic member 76 as shown in FIG. 10.

The heating roller 53 on which the connection power feeders 70 are mounted is rotatably mounted on the side support portions 50*c* and 50*d* of the housing 50 via the bearings 65 as shown in FIG. 3. The gear 67 meshes with the transmission gear 18 as shown in FIGS. 3 and 5, so that the heating roller 53 in this case can receive rotational power.

Further, as shown in FIGS. 10 and 14B, the power feed shaft 72 of the connection power feeder 70 in this case is connected to the power supply device 17 for feeding power via the connection terminal 726. Furthermore, the power feed shafts 72 of the connection power feeders 70 in this case are fixed to, for example, the side support portions 50*c* and 50*d* of the housing 50 not to be rotated.

Then, in a case where rotational power is input to the heating roller 53 from the transmission gear 18 via the gear 67 in the fixing device 5A, the heating roller 53 is rotated in the direction indicated by the arrow B. However, in this case, the frame 71 and the cover 75 of the connection power feeder 70 excluding the power feed shaft 72 are also rotated in the direction indicated by the arrow B. In this case, the rolling bodies 73 move in the direction indicated by the arrow B while rolling.

Figure 14A:
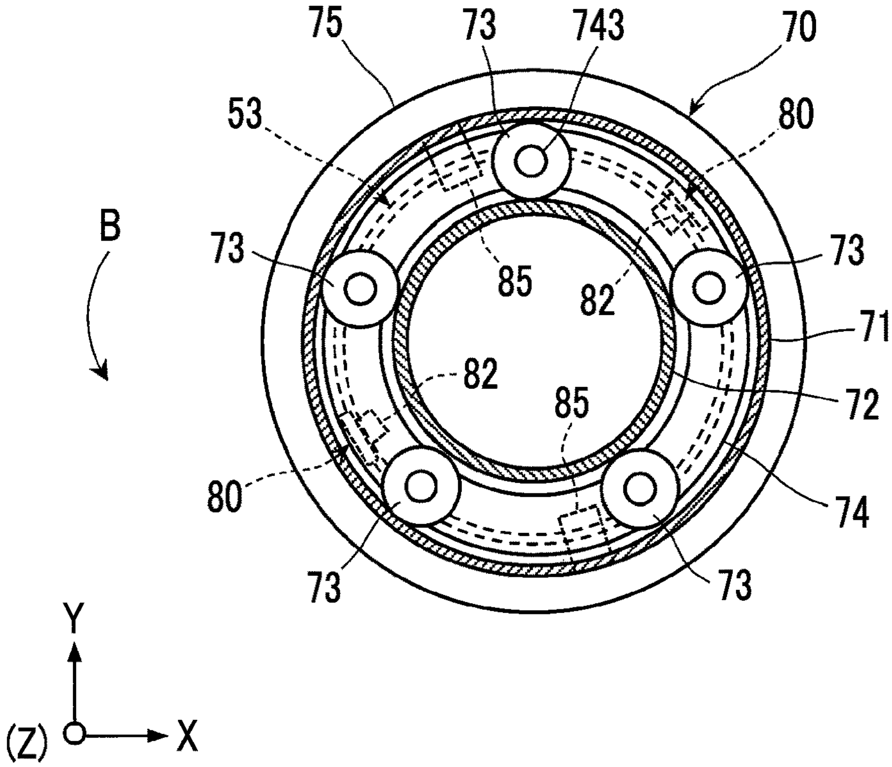
FIG. 14A is a schematic diagram showing the state of the connection power feeder in a case where the connection power feeder is mounted on the heating roller.
Figure 14B:
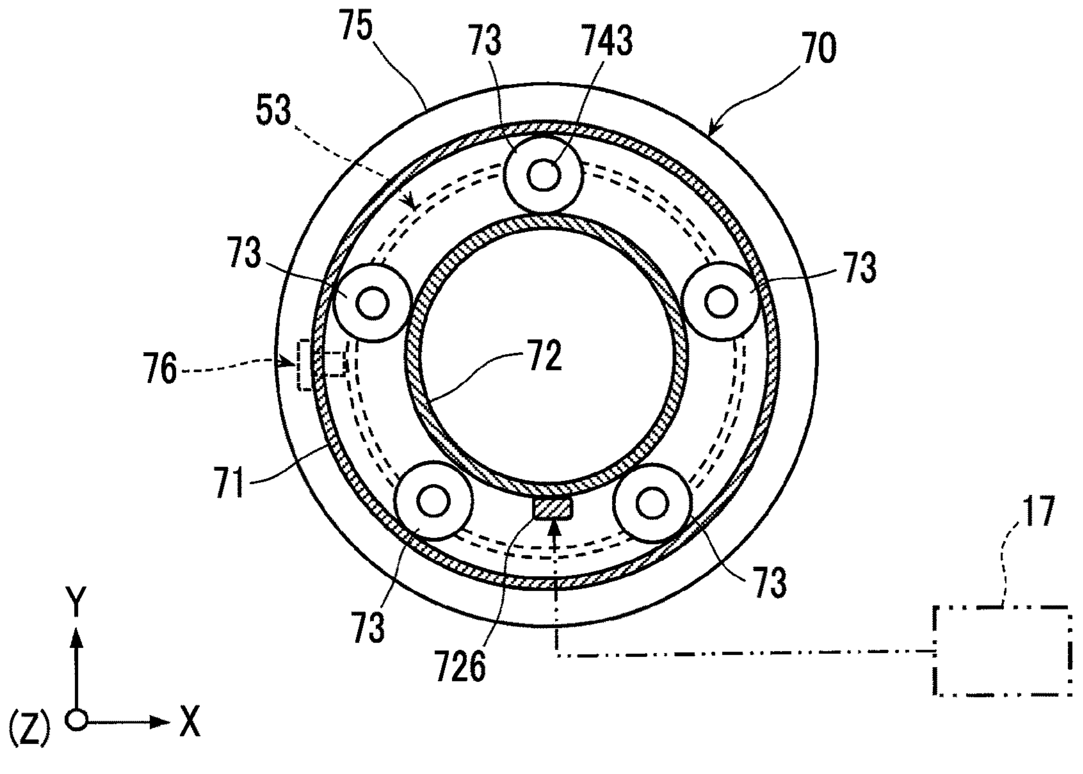
FIG. 14B is a schematic diagram showing another state of the connection power feeder shown in FIG. 14A.

In this case, since the first projecting portions 82 of the mounting portions 80 of the connection power feeder 70 are fitted into the locking holes 538 of the heating roller 53 and the second projecting portions 85 thereof are fitted into the surplus portions 539*n* of the keyways 539 of the heating roller 53 as shown in FIG. 14A, the frame 71 and the cover 75 are integrated with the heating roller 53 and rotated in synchronization with each other in the direction indicated by the arrow B.

Further, as shown in FIGS. 10 and 14B, in a case where a power feed current output from the power supply device 17 is transmitted to the connection power feeder 70 via the connection terminal 726, the current flows to the rolling bodies 73 and the frame 71 in this order from the power feed shaft 72, flows to the extension layers 536 of the power feed layer 535 of the heating roller 53 via the conductive elastic member 76, and finally flows to the resistance heating layer 533 via the power feed layer 535. As a result, power is fed to the fixing device 5A.

In regard to the feed of power to the fixing device 5A, a power feed member does not need to continue to be in contact with a part of the rotating heating roller 53 to be rubbed on the heating roller 53 at a predetermined position (fixed position).

Incidentally, the connection power feeder 70 is removed from the heating roller 53 as follows.

First, the conductive elastic member 76 is removed. Then, the cover 75 is removed. In this case, the fixing of the cover 75 of the exemplary embodiment using the fixing means is released and the divided parts of the cover 75 of the exemplary embodiment are then removed, respectively. Further, the first projecting portion 82 of the mounting portions 80 of the cover 75 are pulled out and detached from the locking holes 538 of the heating roller 53 at the time of this removal work. Finally, the connection power feeders 70 are pulled out in a direction where the connection power feeders 70 are separated from both the end portions 53*b* and 53*c* of the heating roller 53. Accordingly, the connection power feeders 70 are easily removed from the heating roller 53.

In the fixing device 5A described above, power is stably fed without an increase in the size of the device as compared to a case where power is fed to the resistance heating layer 533 of the rotating heating roller 53 via a power feed member being in contact with a part of the rotating heating roller 53 at a predetermined position or a case where the bearings 65 are disposed in the connection power feeders 70 or are disposed at portions of both the end portions 53*b* and 53*c* of the heating roller 53 closer to the outside than the connection power feeders 70 (positions near the middle).

Here, for example, in a case where the bearings 65 are disposed at portions of both the end portions 53*b* and 53*c* of the heating roller 53 closer to the outside than the connection power feeders 70, an interval between the bearings 65 supporting both the end portions 53*b* and 53*c* of the heating roller 53 is increased. For this reason, since the size of the housing 50 on which the bearings 65 are to be mounted needs to be increased, the size of the fixing device 5A is likely to be increased. Moreover, since an interval between the bearings 65 is increased in this case, a load caused by a load applied to the heating roller 53 is also increased. For this reason, the heating roller 53 itself needs to be made of a high-strength material, which is likely to cause an increase in cost.

Further, since a structure for withstanding a load applied to the heating roller 53 or mechanical strength is required in the case of a structure in which the connection power feeders 70 are caused to function as bearings, the size of the connection power feeder 70 is likely to be increased. As a result, the size of the fixing device 5A also cannot but be increased.

Furthermore, in the fixing device 5A, the bearings 65 are disposed at portions of the heating roller 53 that are closer to the outside than the resistance heating layer 533 in the axial direction J. For this reason, the deterioration of the temperature distribution of the heating roller 53 in the axial direction J, which is caused by the transfer of heat generated from the resistance heating layer 533 to the bearings 65, is suppressed as compared to a case where the bearings 65 are disposed at portions overlapping with the resistance heating layer 533.

Further, in the fixing device 5A, the power feed layer 535, which is connected to the resistance heating layer 533 of the heating roller 53 to allow a current to flow, includes the plurality of extension layers 536. For this reason, as compared to a case where the plurality of extension layers 536 are not provided, power can be fed to the resistance heating layer 533 even though the bearings 65 are disposed at both the end portions 53*b* and 53*c* of the heating roller 53.

Furthermore, in the fixing device 5A, the frame 71 of the connection power feeder 70 and the power feed layer 535 of the heating roller 53 are conductively connected to each other via the conductive elastic member 76. Accordingly, while the avoidance of a damage to the power feed layer 535 and the improvement of the attachability/detachability of the connection power feeder 70 to/from the heating roller 53 are ensured, the frame 71 and the power feed layer 535 are accurately connected to each other.

Moreover, in the fixing device 5A, the gear 67 is disposed at a portion of the end portion 53*b* of the heating roller 53 that is closer to the outside than the bearing 65 and closer to the inside than the connection power feeder 70 in the axial direction J of the heating roller 53. For this reason, the deterioration of the temperature distribution of the heating roller 53 in the axial direction J, which is caused by the transfer of heat generated from the resistance heating layer 533 to the gear 67, can be suppressed as compared to a case where the gear 67 is disposed at a portion different from the above-mentioned portion.

Further, since power is stably fed to the resistance heating layer 533 of the heating roller 53 of the fixing device 5A in the image forming apparatus 1A including a fixing device constituted by the fixing device 5A, heat fixing performed by the fixing device 5A is also stable.

Second Exemplary Embodiment

Figure 15:
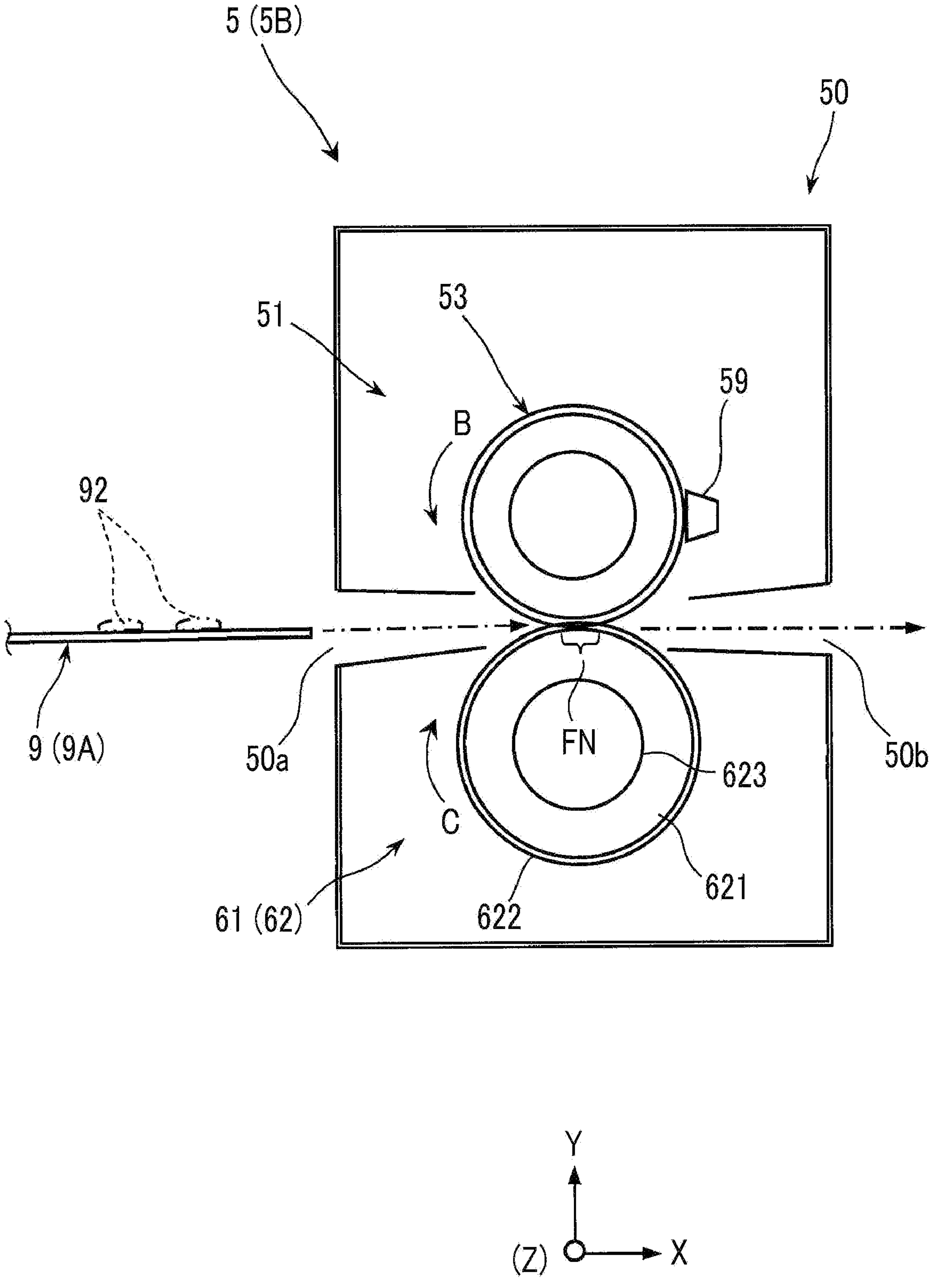
FIG. 15 is a schematic diagram of a fixing device that is an example of a heating device according to a second exemplary embodiment.
Figure 16:
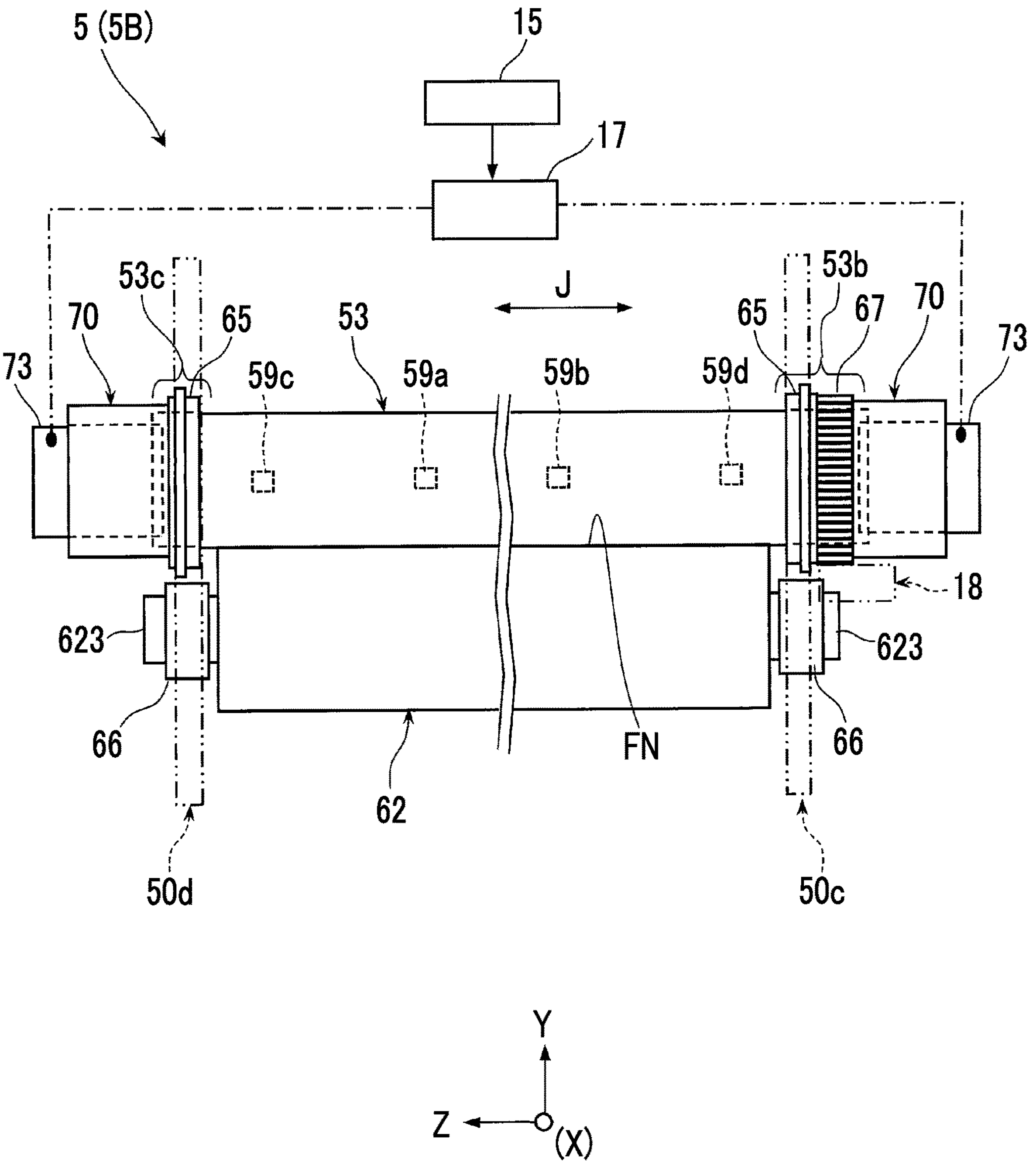
FIG. 16 is a schematic diagram of a part of the fixing device shown in FIG. 15.

FIGS. 15 and 16 show a fixing device 5B that is another example of a heating device 5 according to a second exemplary embodiment.

In a case where the fixing device 5B according to the second exemplary embodiment is compared with the fixing device 5A according to the first exemplary embodiment, the fixing device 5B is different from the fixing device 5A in that the fixing device 5B according to the second exemplary embodiment is a roller-nip type fixing device in which a heating roller 53 is used alone instead of the belt-nip type heating unit 52 as the heating rotor 51 and the heating roller 53 is in direct contact with a pressure roller 62 used as the pressure rotor 61 to form a fixing processing portion FN as shown in FIG. 15 and the like. However, the others of the fixing device 5B are the same as the others of the fixing device 5A.

For this reason, the same components common to the first exemplary embodiment will be denoted in the following description and drawings by the same reference numerals as the reference numerals used in the first exemplary embodiment, and the description thereof will be omitted unless necessary.

In the fixing device 5B, as shown in FIG. 16, the connection power feeders 70 and the bearings 65 of the first exemplary embodiment are mounted on both end portions 53*b* and 53*c* of a heating roller 53 in the same way as described above. Further, in the fixing device 5B, as shown in FIG. 16, the gear 67 of the first exemplary embodiment is mounted on one end portion 53*b* of the heating roller 53 in the same way as described above.

Then, in the fixing device 5B, the pressure roller 62 is directly contact with the heating roller 53 on which the connection power feeders 70, the bearings 65, and the gear 67 are mounted to form the fixing processing portion FN.

In a period in which a fixing operation or the like is to be performed in the fixing device 5B, the resistance heating layer 533 of the heating roller 53 generates heat via the flow of a current and starts to generate heat to keep the heating roller 53 at a required temperature and the heating roller 53 starts to be heated by the generated heat.

Further, in the fixing device 5B, the heating roller 53 starts to rotate in a direction indicated by an arrow B and the pressure roller 62 starts to be rotated in a direction indicated by an arrow C by this rotational drive.

Accordingly, the heating roller 53 is rotated to pass through the fixing processing portion FN while being heated, so that the fixing device 5B is in a state where the fixing operation can be performed.

Further, power is stably fed to the resistance heating layer 533 of the rotating heating roller 53 without an increase in the size of the device even in the fixing device 5B as in the case of the fixing device 5A according to the first exemplary embodiment.

Furthermore, the other effects described above are also obtained in the fixing device 5B as in the case of the fixing device 5A according to the first exemplary embodiment.

Third Exemplary Embodiment

Figure 17:
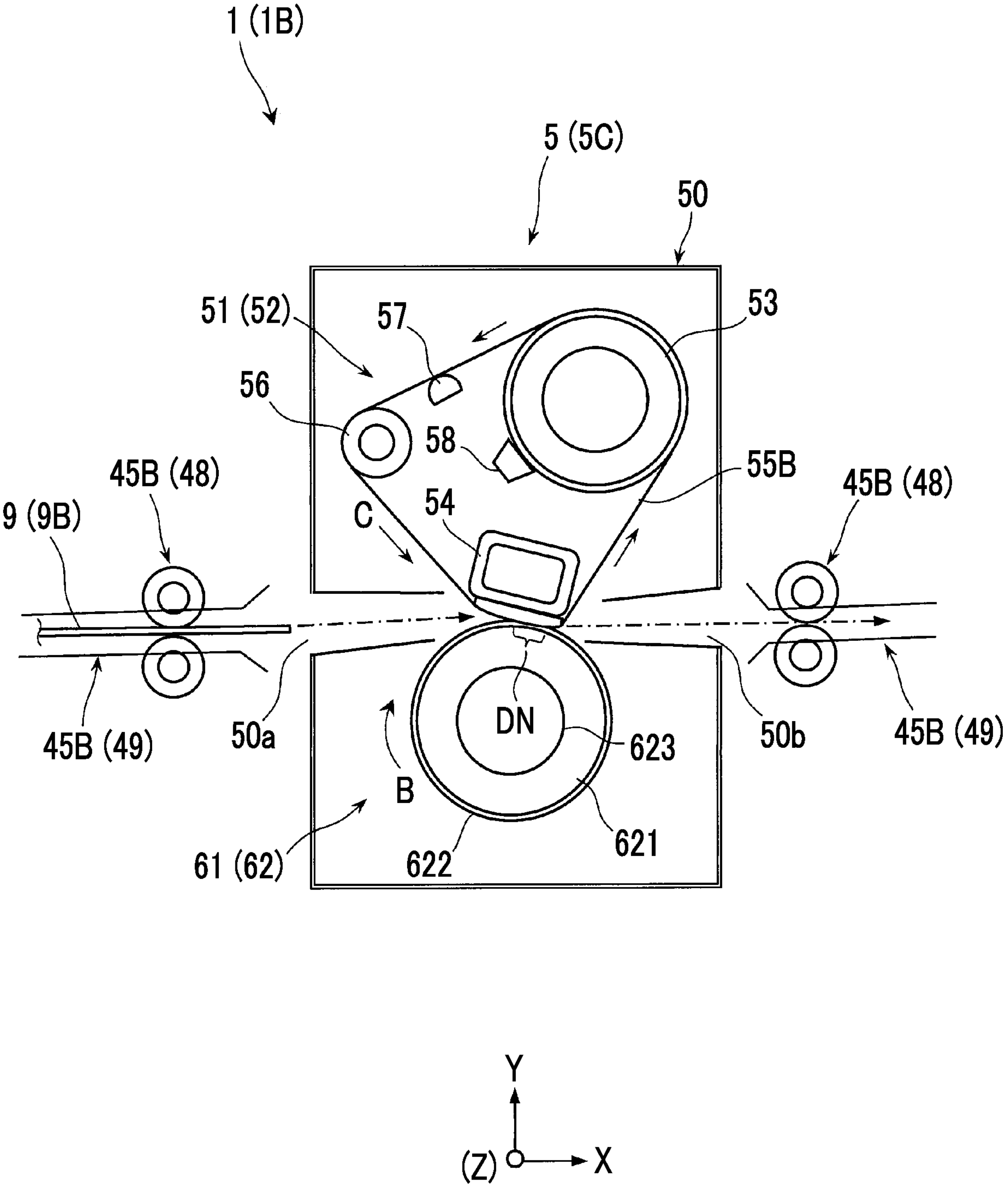
FIG. 17 is a schematic diagram of a heating/drying apparatus that is an example of a heating device and an apparatus utilizing an object to be heated according to a third exemplary embodiment.

FIG. 17 shows a heating device 5C that is still another example of a heating device 5 according to a third exemplary embodiment and a heating/drying apparatus 1B that is another example of an apparatus 1 utilizing an object to be heated using the heating device 5C.

In a case where the heating device 5C according to the third exemplary embodiment is compared with the fixing device 5A according to the first exemplary embodiment, the heating device 5C is different from the fixing device 5A in that the fixing belt 55 is changed to a heating belt 55B. However, the others of the heating device 5C are the same as the others of the fixing device 5A.

For this reason, the same components common to the first exemplary embodiment will be denoted in the following description and drawings by the same reference numerals as the reference numerals used in the first exemplary embodiment, and the description thereof will be omitted unless necessary.

In the heating device 5C, a belt having good thermal conductivity is applied as the heating belt 55B and a belt including a cylindrical belt base made of, for example, a synthetic resin, such as polyimide or polyamide, is used. The fixing belt 55 described above may be used as the heating belt 55B.

Further, in the heating device 5C, a portion where a portion of the heating belt 55B supported by a support member 54 and the pressure roller 62 are in pressure contact with each other is formed as a drying processing portion DN where heating/drying processing is performed.

Further, the heating/drying apparatus 1B using the heating device 5C includes a sheet transport device 45B that transports a sheet-like object 9B, which is required to be dried by heating, as an object 9 to be heated to cause the sheet-like object 9B to be introduced into and to pass through the drying processing portion DN of the heating device 5C. The sheet transport device 45B includes a pair of transport rollers 48, a guide member 49, and the like. Examples of the sheet-like object 9B include the above-mentioned recording medium 9A and the like.

Power is stably fed to the resistance heating layer 533 of the rotating heating roller 53 without an increase in the size of the device even in the heating device 5C as in the case of the fixing device 5A according to the first exemplary embodiment.

Further, the other effects described above are also obtained in the heating device 5C as in the case of the fixing device 5A according to the first exemplary embodiment.

Furthermore, since power is stably fed to the resistance heating layer 533 of the heating roller 53 of the heating device 5C in the heating/drying apparatus 1B, heating/drying performed by the heating device 5C is stable.

Modification Examples

The present invention is not limited to the configuration examples exemplified in the respective exemplary embodiments, and can be modified using necessary changes, combinations, and the like as long as the scope of the present invention described as means for addressing problems is not changed. The present invention also includes, for example, modification examples to be described below.

Figure 18:
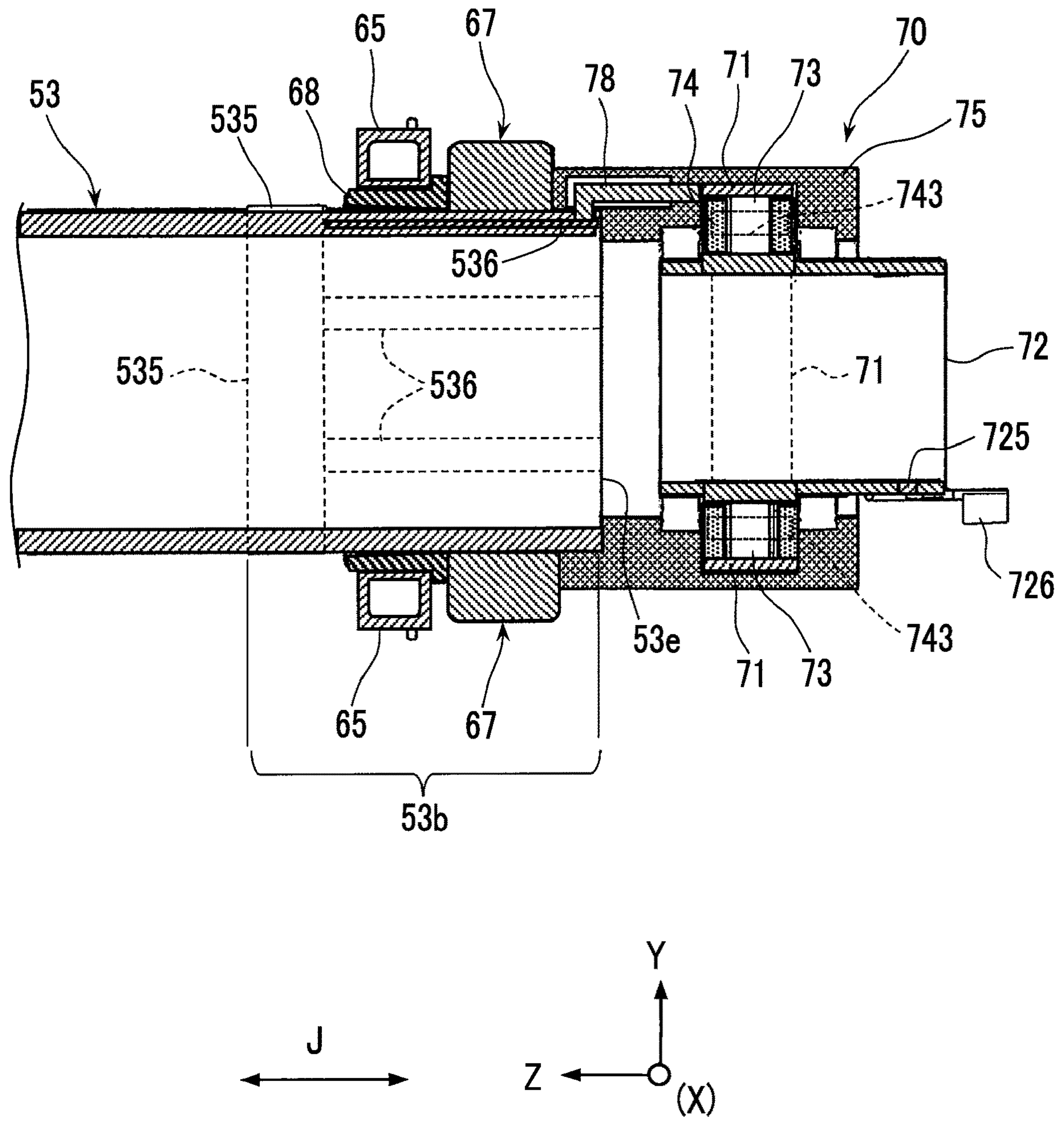
FIG. 18 is a schematic cross-sectional view showing the states of the connection power feeders and the heating roller in a case where a frame of a modification example is applied.

As shown in FIG. 18, the frame 71 of the connection power feeder 70 may include a connection portion 78 that is direct contact with and conductively connected to at least one of a plurality of extension layers 536 of the power feed layer 535 of the heating roller 53, instead of being conductively connected to the extension layer 536 via the conductive elastic member 76. The connection portion 78 is formed integrally at the time of production of the frame 71, or is fixed to the frame 71 as a separate member.

In a case where the frame 71 including such a connection portion 78 is applied, the frame 71 and the power feed layer 535 can be easily connected to each other without work for mounting a separate member at the time of assembly of the connection power feeder 70.

In order to be connected to all the plurality of extension layers 536 of the power feed layer 535 of the heating roller 53, the connection power feeder 70 may be adapted to include conductive elastic members 76 and protruding connection portions 712 of the frame 71 of which the numbers correspond to the number of the extension layers 536, or may be adapted to include connection portions 78 of which the number corresponds to the number of the extension layers 536.

The connection power feeder 70 may employ spheres (balls) as the rolling bodies 73 as long as the rolling bodies 73 roll while being in conductive contact with the inner peripheral surface 71*b* of the frame 71 and the outer peripheral surface 72*a* of the power feed shaft 72.

The adjustment support roller 56 of the heating unit 52 can also be omitted in the fixing devices 5A and 5B and the heating device 5C. For example, a belt-nip type pressure rotor may be applied instead of the roller type pressure roller 62 as the pressure rotors 61 of the fixing devices 5A and 5B and the heating device 5C. In addition, a component, such as a pulley for receiving a timing belt for drive transmission, may be applied instead of the gear 67 as the power receiving component.

Further, a configuration example for forming a monochromatic image is shown as the image forming apparatus LA in the first exemplary embodiment and the like. However, the image forming apparatus may be an apparatus for forming a multicolor image in which a plurality of color toners are combined, and the format and the like of the image forming apparatus are not particularly limited.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A heating device comprising:

a heating roller that includes a resistance heating layer;

a bearing that supports the heating roller to allow the heating roller to be rotatable; and a connection power feeder that is mounted on an end portion of the heating roller, is connected to the resistance heating layer, and feeds power to the resistance heating layer, wherein the connection power feeder includes an annular frame that is disposed to be concentric with the heating roller and is conductively connected to the resistance heating layer, a power feed shaft of which a portion is disposed in the frame and which feeds power, and a plurality of rolling bodies that roll while being in conductive contact with an inner peripheral surface of the frame and an outer peripheral surface of the power feed shaft, and the bearing is mounted on a portion of the end portion of the heating roller that is closer to an inside than the connection power feeder in an axial direction.

2. The heating device according to claim 1, wherein the bearing is disposed at a portion of the heating roller that is closer to an outside than the resistance heating layer in the axial direction.

3. The heating device according to claim 2, wherein the bearing is mounted on the end portion of the heating roller with a resin member interposed therebetween.

4. The heating device according to claim 3, further comprising:

a power receiving component that receives power for rotating the heating roller, wherein the power receiving component is disposed at a portion of the end portion of the heating roller that is closer to an outside than the bearing and closer to an inside than the connection power feeder in the axial direction of the heating roller.

5. An apparatus utilizing a sheet-like object to be heated comprising:

a transport device that transports the sheet-like object to be heated; and a heating device that heats the sheet-like object to be heated transported by the transport device, wherein the heating device is formed of the heating device according to claim 3.

6. The heating device according to claim 2, further comprising:

a power receiving component that receives power for rotating the heating roller, wherein the power receiving component is disposed at a portion of the end portion of the heating roller that is closer to an outside than the bearing and closer to an inside than the connection power feeder in the axial direction of the heating roller.

7. An apparatus utilizing a sheet-like object to be heated comprising:

a transport device that transports the sheet-like object to be heated; and a heating device that heats the sheet-like object to be heated transported by the transport device, wherein the heating device is formed of the heating device according to claim 2.

8. The heating device according to claim 1, wherein the bearing is mounted on the end portion of the heating roller with a resin member interposed therebetween.

9. The heating device according to claim 8, further comprising:

a power receiving component that receives power for rotating the heating roller, wherein the power receiving component is disposed at a portion of the end portion of the heating roller that is closer to an outside than the bearing and closer to an inside than the connection power feeder in the axial direction of the heating roller.

10. An apparatus utilizing a sheet-like object to be heated comprising:

a transport device that transports the sheet-like object to be heated; and a heating device that heats the sheet-like object to be heated transported by the transport device, wherein the heating device is formed of the heating device according to claim 8.

11. The heating device according to claim 1, wherein the heating roller includes a power feed layer that is provided at a portion of the heating roller between the resistance heating layer and the bearing and along a circumferential direction and conductively connected to the resistance heating layer, and the power feed layer includes a plurality of extension layers that are arranged at intervals in the circumferential direction of the heating roller and extend up to a portion of the heating roller closer to an outside than the bearing in the axial direction.

12. The heating device according to claim 11, wherein the frame is conductively connected to at least one of the plurality of extension layers via a conductive elastic member that is in contact with at least one of the plurality of extension layers.

13. The heating device according to claim 12, further comprising:

a power receiving component that receives power for rotating the heating roller, wherein the power receiving component is disposed at a portion of the end portion of the heating roller that is closer to an outside than the bearing and closer to an inside than the connection power feeder in the axial direction of the heating roller.

14. The heating device according to claim 11, wherein the frame includes a connection portion that is in contact with and conductively connected to at least one of the plurality of extension layers of the heating roller.

15. The heating device according to claim 14, further comprising:

a power receiving component that receives power for rotating the heating roller, wherein the power receiving component is disposed at a portion of the end portion of the heating roller that is closer to an outside than the bearing and closer to an inside than the connection power feeder in the axial direction of the heating roller.

16. The heating device according to claim 11, further comprising:

a power receiving component that receives power for rotating the heating roller, wherein the power receiving component is disposed at a portion of the end portion of the heating roller that is closer to an outside than the bearing and closer to an inside than the connection power feeder in the axial direction of the heating roller.

17. An apparatus utilizing a sheet-like object to be heated comprising:

a transport device that transports the sheet-like object to be heated; and a heating device that heats the sheet-like object to be heated transported by the transport device, wherein the heating device is formed of the heating device according to claim 11.

18. The heating device according to claim 1, further comprising:

a power receiving component that receives power for rotating the heating roller, wherein the power receiving component is disposed at a portion of the end portion of the heating roller that is closer to an outside than the bearing and closer to an inside than the connection power feeder in the axial direction of the heating roller.

19. An apparatus utilizing a sheet-like object to be heated comprising:

a transport device that transports the sheet-like object to be heated; and a heating device that heats the sheet-like object to be heated transported by the transport device, wherein the heating device is formed of the heating device according to claim 1.

20. The apparatus utilizing a sheet-like object to be heated according to claim 19, wherein the heating device is a fixing device that fixes an unfixed image to a recording medium used as the sheet-like object to be heated.

* * * * *